US012238298B2

(12) United States Patent
Huo et al.

(10) Patent No.: US 12,238,298 B2
(45) Date of Patent: Feb. 25, 2025

(54) MAPPING METHOD, ENCODER, DECODER AND COMPUTER STORAGE MEDIUM

(71) Applicant: GUANGDONG OPPO MOBILE TELECOMMUNICATIONS CORP., LTD., Guangdong (CN)

(72) Inventors: Junyan Huo, Dongguan (CN); Yanzhuo Ma, Dongguan (CN); Shuai Wan, Dongguan (CN); Fuzheng Yang, Dongguan (CN); Xinwei Li, Dongguan (CN); Haixin Wang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/966,055

(22) Filed: Oct. 14, 2022

(65) Prior Publication Data

US 2023/0051649 A1 Feb. 16, 2023

Related U.S. Application Data

(63) Continuation of application No. 17/319,900, filed on May 13, 2021, now Pat. No. 11,546,608, which is a
(Continued)

(51) Int. Cl.
*H04N 19/159* (2014.01)
*H04N 19/176* (2014.01)
(Continued)

(52) U.S. Cl.
CPC ......... *H04N 19/159* (2014.11); *H04N 19/176* (2014.11); *H04N 19/186* (2014.11); *H04N 19/593* (2014.11)

(58) Field of Classification Search
CPC .... H04N 19/11; H04N 19/159; H04N 19/176; H04N 19/186; H04N 19/593
See application file for complete search history.

(56) References Cited

U.S. PATENT DOCUMENTS

| 11,134,257 B2 | 9/2021 | Zhao et al. |
| 2015/0043634 A1 | 2/2015 | Lin et al. |

(Continued)

FOREIGN PATENT DOCUMENTS

| CN | 102857764 A | 1/2013 |
| CN | 103067699 A | 4/2013 |

(Continued)

OTHER PUBLICATIONS

International Search Report issued Mar. 25, 2020 of PCT/CN2019/092701 (4 pages).
(Continued)

*Primary Examiner* — Md N Haque
(74) *Attorney, Agent, or Firm* — Perkins Coie LLP

(57) ABSTRACT

Disclosed in the implementations of the present disclosure are a mapping method, an encoder, a decoder, and a computer storage medium. The method may include: determining an intra prediction mode used at the time of encoding or decoding a current block; mapping, if the intra prediction mode is a MIP mode, the MIP mode to a first non-MIP mode; and mapping, if the intra prediction mode is a non-MIP mode, the non-MIP mode to a second MIP mode.

20 Claims, 15 Drawing Sheets

Related U.S. Application Data continuation of application No. PCT/CN2019/092701, filed on Jun. 25, 2019.

(51) Int. Cl.
    *H04N 19/186*     (2014.01)
    *H04N 19/593*     (2014.01)

(56) References Cited

U.S. PATENT DOCUMENTS

| | | | |
|---|---|---|---|
| 2017/0272745 A1 | 9/2017 | Liu et al. | |
| 2020/0344468 A1 | 10/2020 | Lin et al. | |
| 2020/0389671 A1* | 12/2020 | Zhao | H04N 19/119 |
| 2020/0396455 A1* | 12/2020 | Liu | H04N 19/176 |
| 2020/0396459 A1 | 12/2020 | Lin et al. | |
| 2020/0404324 A1 | 12/2020 | Pham Van et al. | |
| 2020/0404325 A1* | 12/2020 | Ramasubramonian | H04N 19/11 |
| 2022/0014732 A1* | 1/2022 | Filippov | H04N 19/132 |
| 2022/0038706 A1* | 2/2022 | Zhang | H04N 19/593 |
| 2022/0094947 A1 | 3/2022 | Ma et al. | |
| 2022/0217366 A1* | 7/2022 | Kim | H04N 19/70 |

FOREIGN PATENT DOCUMENTS

| | | |
|---|---|---|
| CN | 109792520 A | 5/2019 |
| CN | 109792521 A | 5/2019 |
| KR | 20200141703 A | 12/2020 |
| RU | 2536366 C2 | 12/2014 |
| RU | 2673011 C1 | 11/2018 |
| WO | 2012172779 A1 | 12/2012 |
| WO | 2013129878 A1 | 9/2013 |
| WO | 2018026148 A1 | 2/2018 |
| WO | 2018080135 A1 | 5/2018 |
| WO | 2019094464 A1 | 5/2019 |
| WO | 2019098464 A1 | 5/2019 |

OTHER PUBLICATIONS

Bross, B. et al. "Versatile Video Coding (Draft 5)" JVET-N1001-v8; JVET of ITU-T SG16 WP 3 and ISO/IEC JTC 1/SC 29/WG 11; Geneva, CH, Mar. 19-27, 2019. 396 pages (uploaded in 3 parts).

Examination Report for Russian Application No. 2021117432 issued Oct. 20, 2021. 8 pages with English translation.

Extended European Search Report for European Application No. 19934815.2 issued Dec. 23, 2021. 13 pages.

Fraunhofer-HHI "CE3-related: Non-linear weighted intra prediction (cross-check report in JVET-K0262)" JVET-K0196-v3; JVET of ITU-T SG 16 WP 3 and ISO-IEC JTC 1/SC 29/WG 11; Ljubljana, SI, Jul. 10-18, 2018. 7 pages.

Huawei Technologies Co., Ltd. "Non-CE3: Simplifications of Intra Mode Coding for Matrix-based Intra Prediction" JVET-O0170-v1; JVET of ITU-T SG 16 WP 3 and ISO/IEC JTC 1/SC 29/WG11; Gothenburg, SE, Jul. 3-12, 2019. 4 pages.

Korea Aerospace University et al. "Non-CE3: MIP Modifications" JVET-O0202; JVET of ITU-T SG 16 WP 3 and ISO/IEC JTC 1/SC 29/WG 11; Gothenburg, SE, Jul. 3-12, 2019. 4 pages.

Qualcomm Technologies Inc. "Non-CE3: MIP simplifications" JVET-O0187-v1; JVET of ITU-T SG 16 WP3 and ISO-IEC JTC 1/SC 29/WG 11; Gothenburg, SE; Jul. 3-12, 2019. 5 pages.

Xidian University et al. "Non-CE3: Removal of MIP mapping table" JVET-O0321; JVET of ITU-T SG 16 WP 3 and ISO/IEC JTC 1/SC 29/WG11; Gothenburg, SE, Jul. 3-12, 2019. 6 pages.

Decision to Grant a Patent for Russian Application No. 2021117432 issued Feb. 9, 2022. 21 pages with English translation.

Examination Report for Indian Application No. 202127021826 issued Feb. 24, 2022. 7 pages with English translation.

Examination Report No. 1 for Australian Application No. 2019454117 issued Apr. 5, 2022. 2 pages.

Office Action Mailed Aug. 18, 2022 in Canada Application No. 3121563, 7 pages.

Examination Report Mailed Jul. 14, 2022 In EP Application No. 19934815.2, 7 pages.

Choi et al., CE3-Related:Chroma CM Modification, Joint Video Experts Team of ITU-T SG 16 WP3, 12th Meeting: Macao, CN Oct. 3-12, 2018, XP30194379, 5 pages.

Chen et al., Algorithm Description for Versatile Video Coding and Test Model 5 (VTM 5), Joint Video Experts Team of ITU-T SG 16 WP3, 14TH Meeting: Geneva, CH, Mar. 19-27, 2019, XP20305562, 76 pages.

First Office Action for Chinese Application No. 202110479770.9 issued Sep. 20, 2022. 14 pages with English translation.

Written Opinion Mailed Mar. 25, 2020 in Application No. PCT/CN2019/092701.

Non-Final Office Action issued Jul. 15, 2021 of U.S. Appl. No. 17/319,900 , filed May 13, 2021.

Final Office Action mailed Nov. 24, 2021 in U.S. Appl. No. 17/319,900.

Non-final Office Action mailed Feb. 18, 2022 in U.S. Appl. No. 17/319,900.

US Notice of Allowance mailed Jul. 6, 2022 in U.S. Appl. No. 17/319,900.

US Corrected Notice of Allowability mailed Oct. 5, 2022 in U.S. Appl. No. 17/319,900.

Decision of Refusal for Japanese Application No. 2021-555866 issued Apr. 25, 2023. 11 pages with English translation.

Examiner's Report for Canadian Application No. 3121563 issued May 17, 2023. 5 pages.

First Office Action mailed Apr. 27, 2023 in U.S. Appl. No. 17/965,986. 24 pages.

Second Office Action for Chinese Application No. 2021104797709 issued Feb. 26, 2023. 16 pages with English translation.

Corrected Notice of Allowability for U.S. Appl. No. 17/319,900 issued Dec. 1, 2022. 4 pages.

Notice of Reasons for Refusal for Japanese Application No. 2021-555866 issued Oct. 28, 2022. 8 pages with English translation.

Summons to Attend Oral Proceedings for European Application No. 19934815.2 issued Dec. 20, 2022. 11 pages.

Office Action of Israeli Application No. 283494 issued on Aug. 31, 2023, 4 pages.

Office Action of Indonesian Application No. P00202104870 issued on Sep. 6, 2023, 5 pages with English translation.

Substantive Examination Report of Vietnamese Application No. 1-2021-03903 issued on Aug. 14, 2023, 4 pages with English translation.

Notice of Allowance of U.S. Appl. No. 17/965,986 issued on Oct. 20, 2023, 13 pages.

Notice of Termination of Reconsideration by Examiners before Appeal Proceedings of Japanese Application No. 2021-555866 issued on Oct. 24, 2023, 2 pages with English translation.

Reconsideration Report by Examiner before Appeal of Japanese Application No. 2021-555866 issued on Oct. 24, 2023, 14 pages with English translation.

Search report of the European application No. 23174379.0, issued on Jun. 26, 2023. 14 pages.

Decision to Refuse European Patent Application of the European application No. 19934815.2, issued on Jun. 1, 2023. 14 pages.

Second Office Action of the U.S. Appl. No. 17/965,986, issued on Aug. 3, 2023. 16 pages.

First Office Action of the European application No. 23174379.0, issued on Nov. 10, 2023. 7 pages.

Corrected Notice of Allowability for U.S. Appl. No. 17/965,986 issued on Dec. 6, 2023. 6 pages.

Corrected Notice of Allowability for U.S. Appl. No. 17/965,986 issued on Jan. 11, 2024. 6 pages.

Summons to attend oral proceedings of the European application No. 23174379.0, issued on Mar. 18, 2024. 9 pages.

Written Opinion of the Singaporean application No. 11202106235V, issued on Mar. 21, 2024. 9 pages.

Substantive Examination_Adverse Report of the Malaysian application No. PI2021002992, issued on Apr. 29, 2024. 4 pages.

First Office Action of the MX application No. MX/a/2021/00783, issued on Jun. 25, 2024. 6 pages with English translation.

(56) References Cited

OTHER PUBLICATIONS

Brief communication of European application No. 23174379.0 issued on Oct. 23, 2024, 3pages.
Trail and appeal decision of Japanese application No. 2021-555866 issued on Nov. 19, 64 pages with English translation.

* cited by examiner

MAPPING METHOD, ENCODER, DECODER AND COMPUTER STORAGE MEDIUM

This application is a continuation application of U.S. application Ser. No. 17/319,900 filed on May 13, 2021, which is a continuation application of International PCT Application No. PCT/CN2019/092701 filed on Jun. 25, 2019, the entire content of both are hereby incorporated by reference.

TECHNICAL FIELD

Implementations of the present disclosure relate to a mapping technology of an intra prediction mode in the field of video coding, in particular to a mapping method, an encoder, a decoder and a computer storage medium.

BACKGROUND

At present, due to the introduction of Matrix-based Intra Prediction (MIP) technology, mutual mapping needs to be performed between a non-MIP mode and a MIP mode in Versatile Video Coding (VVC). Specifically, during the construction of a Most Probable Modes List (MPM) and the acquisition of a Direct Mode (DM), the MIP mode needs to be mapped to the non-MIP mode through a "MIP-conventional mapping table". During the construction of a MIP_MPM list, a mapping from the non-MIP mode to the MIP mode needs to be performed through a "65-33 mapping table" and a "conventional-MIP mapping table".

However, the above mapping processes are very complicated, which increases the complexity. Moreover, since both an encoding end and a decoding end need to store all tables for mapping, certain memory space is occupied. Therefore, it can be seen that the existing methods of mapping between the MIP mode and the non-MIP mode are relatively complex, which is not conducive to improving encoding and decoding rates.

SUMMARY

The implementations of the present disclosure provide a mapping method, an encoder, a decoder, and a computer storage medium.

The technical solutions of the implementations of the present disclosure may be implemented as follows.

In a first aspect, an implementation of the present disclosure provides a mapping method, which is applied to an encoder or a decoder, the method including:
   determining an intra prediction mode used for encoding or decoding a current block;
   mapping, if the intra prediction mode is a Matrix-based Intra Prediction (MIP) mode, the MIP mode to a first non-MIP mode; and
   mapping, if the intra prediction mode is a non-MIP mode, the non-MIP mode to a second MIP mode,
   wherein the non-MIP modes include a direct current intra prediction mode, a planar intra prediction mode and a directional intra prediction mode, the first non-MIP mode is one of the non-MIP modes preset before encoding or decoding the current block, and the second MIP mode is one of the MIP modes preset before encoding or decoding the current block.

In a second aspect, an implementation of the present disclosure provides an encoder, including:
   a first determining module configured to determine an intra prediction mode used for encoding a current block;
   a first mapping module configured to map, if the intra prediction mode is a Matrix-based Intra Prediction (MIP) mode, the MIP mode to a first non-MIP mode; and
   a second mapping module configured to map, if the intra prediction mode is a non-MIP mode, the non-MIP mode to a second MIP mode,
   wherein the non-MIP modes include a direct current intra prediction mode, a planar intra prediction mode and a directional intra prediction mode; the first non-MIP mode is one of the non-MIP modes preset before encoding the current block, and the second MIP mode is one of the MIP modes preset before encoding the current block.

In a third aspect, an implementation of the present disclosure provides an encoder, including:
   a processor and a storage medium storing instructions executable by the processor, the storage medium relying on the processor to execute an operation through a communication bus, and when the instructions are executed by the processor, the mapping method in one or more of the implementations being executed.

In a fourth aspect, an implementation of the present disclosure provides a decoder, including:
   a second determining module configured to determine an intra prediction mode used for decoding a current block;
   a third mapping module configured to map, if the intra prediction mode is a Matrix-based Intra Prediction (MIP) mode, the MIP mode to a first non-MIP mode; and
   a fourth mapping module configured to map, if the intra prediction mode is a non-MIP mode, the non-MIP mode to a second MIP mode,
   wherein the non-MIP modes include a direct current intra prediction mode, a planar intra prediction mode and a directional intra prediction mode; the first non-MIP mode is one of the non-MIP modes preset before decoding the current block, and the second MIP mode is one of the MIP modes preset before decoding the current block.

In a fifth aspect, an implementation of the present disclosure provides a decoder, including:
   a processor and a storage medium storing instructions executable by the processor, the storage medium relying on the processor to execute an operation through a communication bus, and when the instructions are executed by the processor, the mapping method in one or more of the implementations being executed.

In a sixth aspect, an implementation of the present disclosure provides a computer readable storage medium in which executable instructions are stored, when the executable instructions are executed by one or more processors, the processor(s) executing the mapping method in one or more of the implementations.

DETAILED DESCRIPTION

Figure 1:
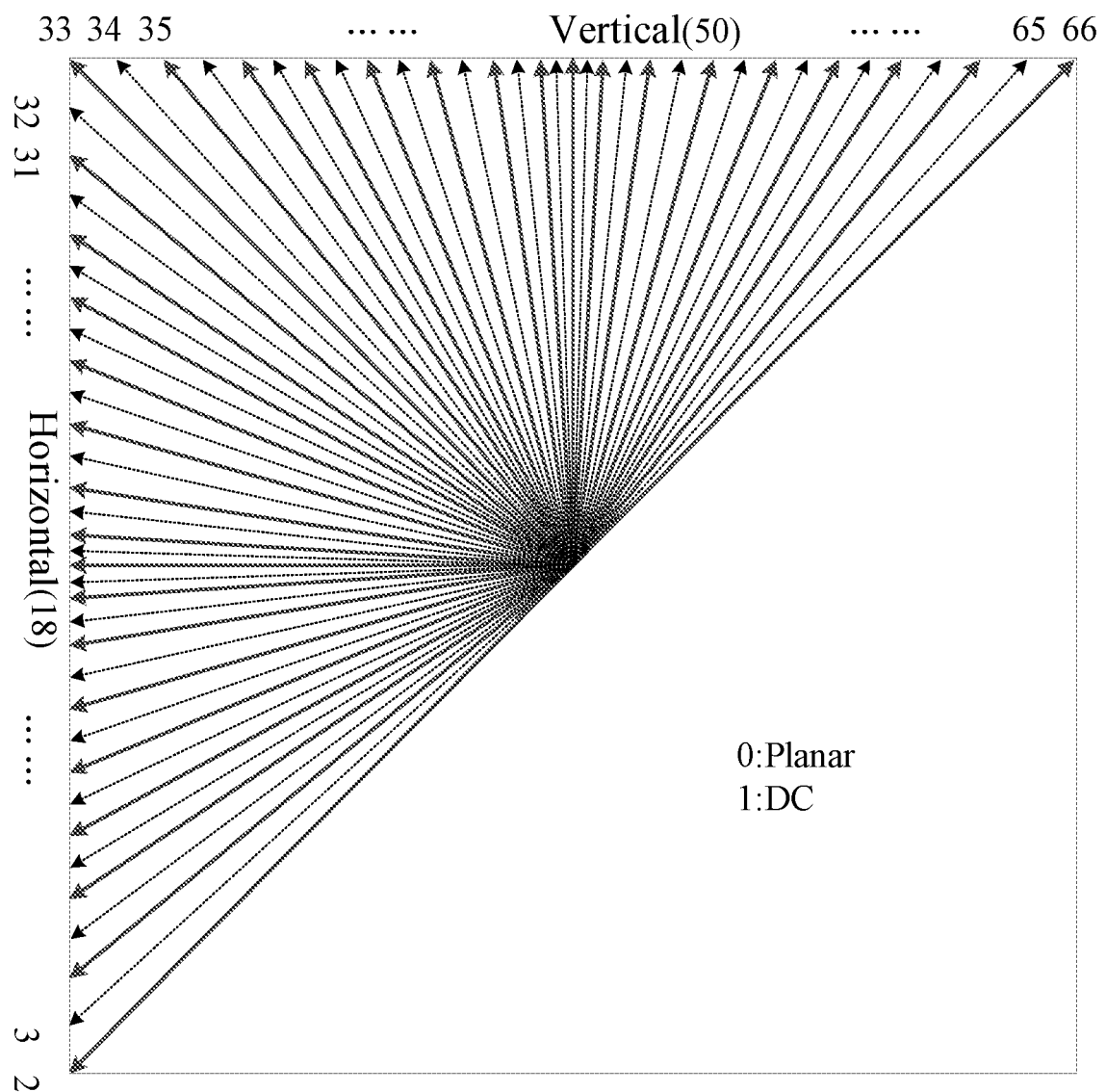
FIG. 1 is a schematic diagram of arrangement of 67 prediction modes in intra prediction.

The technical solutions in the implementations of the present disclosure will be clearly and completely described below with reference to the drawings in the implementations of the present disclosure. It may be understood that the specific implementations described here are only used to explain the relevant application, rather than limit the application. In addition, it should be noted that for convenience of description, only the parts related to the relevant application are shown in the drawings.

For video pictures, Affine Linear Weighted Intra Prediction proposed in the Joint Video Experts Team (JVET)-N0217 has been accepted in the latest Versatile Video Coding (VVC) (draft 5), and has been renamed as Matrix-based Intra Prediction (MIP). In this technology, different numbers of matrix-based intra prediction modes are added in the process of intra luma prediction according to different sizes of intra luma encoding and decoding blocks.

In order to capture the finer edge direction presented in natural video, in VVC, 33 intra luma prediction angle modes defined in High Efficiency Video Coding (HEVC) have been expanded to 65 intra luma prediction angle modes. FIG. 1 is a schematic diagram of arrangement of 67 prediction modes in intra prediction. As shown in FIG. 1, arrows numbered 2-66 represent 65 intra angle prediction modes, and there are two further non-angle modes, i.e., a planar intra prediction mode Planar numbered 0 and a direct current intra prediction mode DC numbered 1. Therefore, the intra prediction process in VVC includes 2 non-angle modes and 65 angle modes. Here, these 67 prediction modes are called intra prediction modes.

In the MIP technology, luma blocks are divided into three types according to the sizes of intra luma encoding and decoding blocks. Setting the size of a luma block to be W*H, the luma blocks may be divided into three types according to the sizes of the luma blocks as follows.

Luma blocks with a size of 4×4 are first-type luma blocks, luma blocks with a size of 8×4, 4×8 or 8×8 are second-type luma blocks, and luma blocks with other sizes are third-type luma blocks.

For these three types of intra luma encoding and decoding blocks, in the MIP technology, M MIP modes are added on the basis of the 67 intra prediction modes.

For the first-type luma blocks, M=35; for the second-type luma blocks, M=19; and for the third-type luma blocks, M=11.

Specifically, the MIP technology is only used in intra luma prediction, and like the non-MIP mode, the input of MIP prediction is also data in the above line and the left column of the current block (equivalent to the current block mentioned hereinafter), and the output is a predicted value of the current block. The specific prediction process is divided into three steps: averaging, matrix vector multiplication and interpolation. That is, by performing the three-step operation on the input reconstructed luma values of adjacent pixels in the above line and the left column, the predicted luma value of the current block may be obtained.

Figure 2:
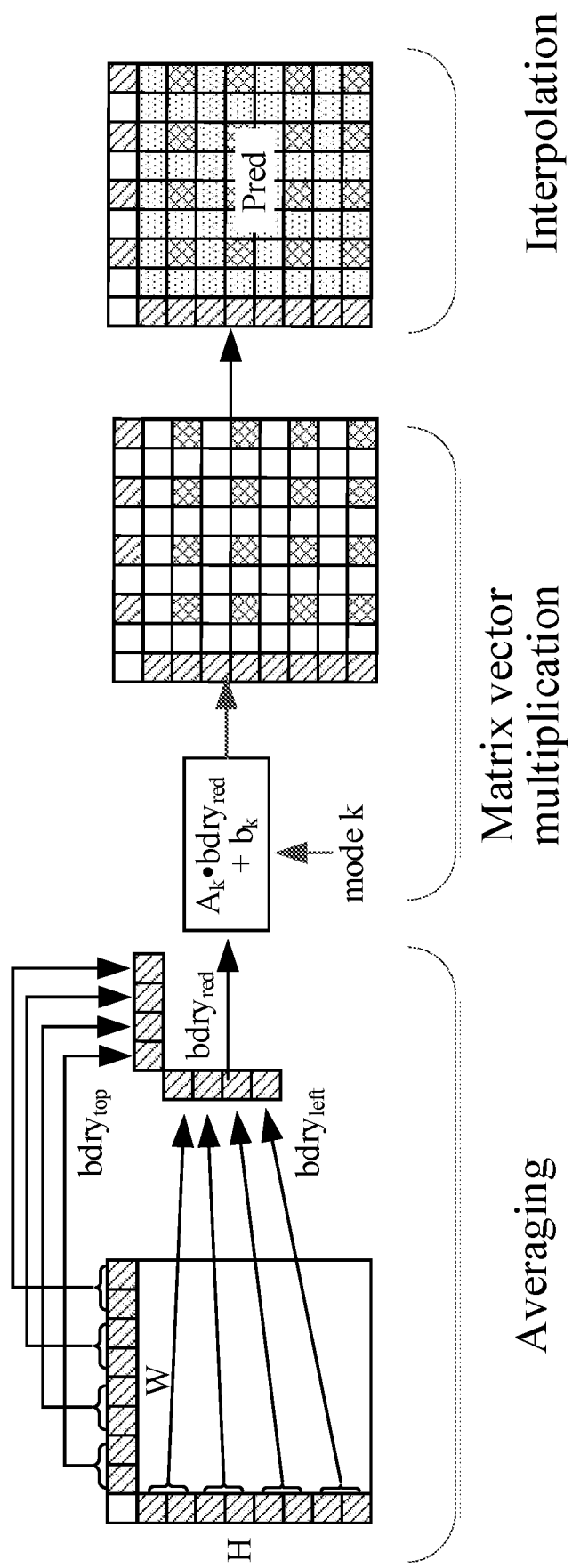
FIG. 2 is a schematic flow chart of encoding using a MIP mode.

FIG. 2 is a schematic flow chart of encoding using the MIP mode. As shown in FIG. 2, the specific implementation is as follows:

In step 1, an averaging operation is performed on the above adjacent reference points of the current luma block to obtain a vector $bdry_{top}$, with N values in total, and an averaging operation is performed on the left adjacent reference points of the current luma block to obtain a vector $bdry_{left}$, with N values in total. When the luma block is a first-type block according to its size, N=2; and when the luma block is a second or third-type block according to its size, N=4. The vector $bdry_{top}$ and the vector $bdry_{left}$ form a new vector $bdry_{red}$ for the subsequent operations.

In step 2, corresponding matrix $A_k$ and offset $b_k$ are acquired through the mode number k, and partial predicted values of the current block identified by cross lines in FIG. 2 are calculated through the following formula (1):

$$Pred_{red} = A_k \cdot bdry_{red} + b_k \qquad (1)$$

In step 3, the remaining predicted values $Pred_{red}$ in the current block are obtained by linear interpolation.

In addition, in the MIP technology-based encoding process, the encoding mode specifically used in intra prediction should be written into a compressed bitstream, and the decoding end parses the mode information to determine which of the non-MIP mode and the MIP mode is used specifically. If the non-MIP mode is used, which specific type of non-MIP mode is used is determined; and if the MIP mode is used, which specific type of MIP mode is used is determined.

It should be noted that in the intra prediction of VVC, the encoder may perform comparison of Rate Distortion cost (RDcost) among 67 non-MIP modes and M MIP modes for each luma block, and select the optimal mode (equivalent to the optimal intra prediction mode mentioned hereinafter) for encoding.

Figure 3:
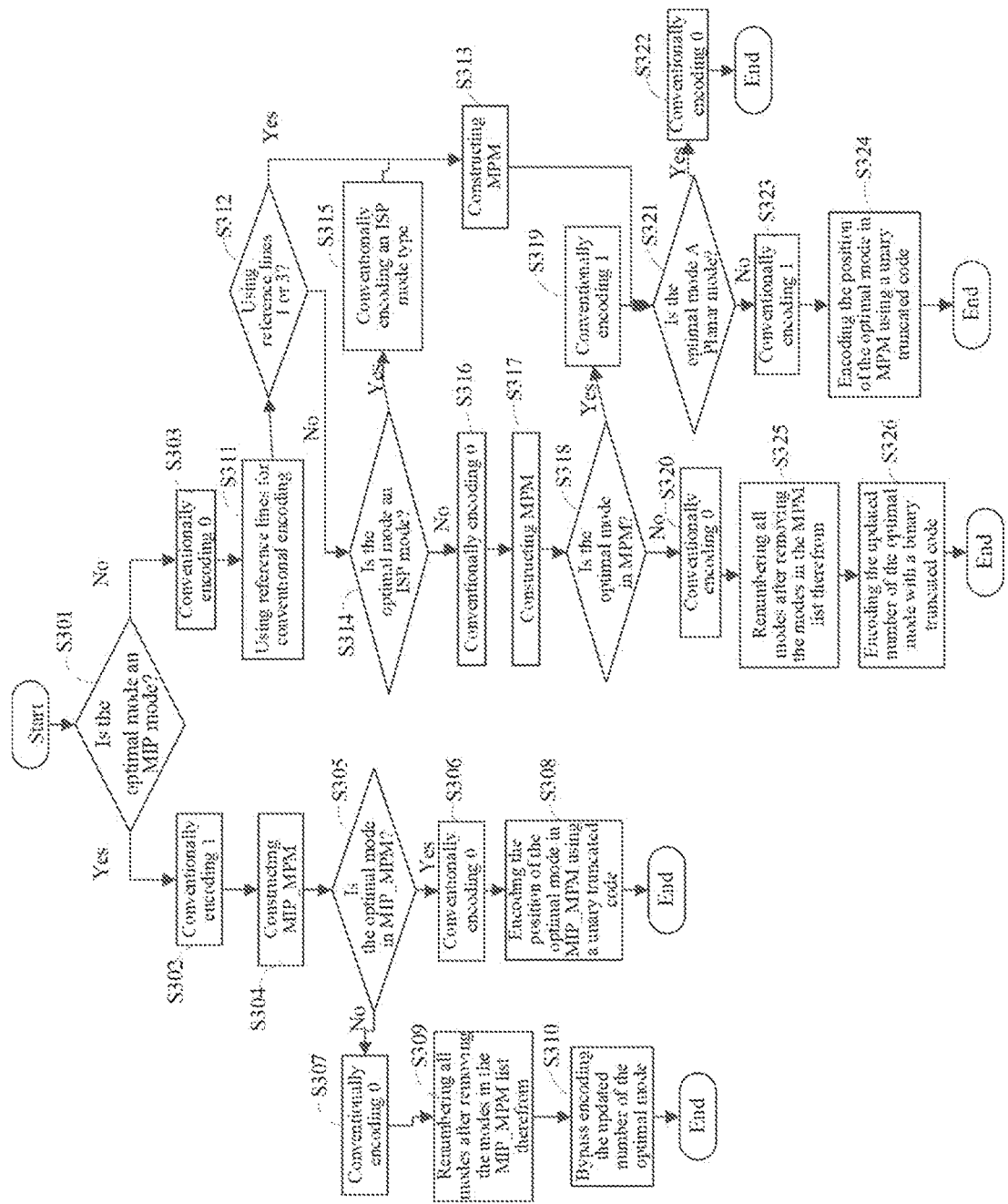
FIG. 3 is a schematic flow chart of encoding using an intra mode of a MIP list.

However, in the encoder and the decoder, in order to save bit overhead, MPM list-based intra prediction technology is used in VVC. FIG. 3 is a schematic flow chart of encoding using an intra mode of a MIP list. As shown in FIG. 3, the method may include:

S301, encoding mip_flag by a conventional encoder first: if the optimal mode (equivalent to the optimal intra prediction mode mentioned hereinafter) is the MIP mode, executing S302, otherwise, executing S303;

S302, conventionally encoding 1, and executing S304;

S304, constructing MIP_MPM, and executing S305;

S305, mip_flag being 1, encoding mip_mpm_flag by the conventional encoder: if the optimal mode is in MIP_MPM, executing S306, otherwise, executing S307;

S306, conventionally encoding 1, and executing S308;

S308, if mip_mpm_flag is 1, encoding the position in the MIP_MPM list using a unary truncated code:
if the optimal mode ranks first in the MIP_MPM list, bypass encoding 0;
if the optimal mode ranks second in the MIP_MPM list, bypass encoding 10; and
if the optimal mode ranks third in the MIP_MPM list, bypass encoding 11;

S307, if mip_mpm_flag is 0, updating the number of the optimal mode, and executing S309;

S309, renumbering all modes after removing the modes in the MIP_MPM list therefrom, and executing S310;

S310, encoding the updated number of the optimal mode using a bypass encoder, and ending.

S303, conventionally encoding 0, and executing S311;

S311, mip_flag being 0, using reference lines 0, 1 and 3 for conventional encoding, and executing S312;

S312, determining whether reference lines 1 or 3 are used, if so, executing S313, if not, executing S314;

S313, constructing MPM, and executing S321;

S314, determining whether the optimal mode is an ISP mode, if so, executing S315, if not, executing S316;

S315, encoding isp_flag by the conventional encoder: encoding the ISP mode, and executing S313;

S316, conventionally encoding 0, and executing S317;

S317, constructing MPM, and executing S318;

S318, encoding mpm_flag by the conventional encoder: determining whether the optimal mode is in MPM, if so, executing S319, if not, executing S320;

S319, conventionally encoding 1, and executing S321;

S320, conventionally encoding 0, and executing S325;

S325, updating the number of the optimal mode, renumbering all modes after removing the modes in the MPM list therefrom, and executing S326;

S326, encoding the updated number of the optimal mode with a binary truncated code, and ending.

S321, determining whether the optimal mode is Planar mode, if so, executing S322, if not, executing S323;

S322, if the optimal mode ranks first in the MPM list, the optimal mode being PLANAR mode: conventionally encoding 0, and ending.

S323, conventionally encoding 1, and executing S324;

S324, mpm_flag being 1, then encoding the position in the MPM list using a unary truncated code;
if the optimal mode ranks second in the MPM list, bypass encoding 10;
if the optimal mode ranks third in the MPM list, bypass encoding 110;
if the optimal mode ranks fourth in the MPM list, bypass encoding 1110;
if the optimal mode ranks fifth in the MPM list, bypass encoding 11110;
if the optimal mode ranks sixth in the MPM list, bypass encoding 11111.

It should be noted that since the extend reference line technology and the Intra Sub-Partitionar (ISP) technology are only used for the modes in the MPM list, when extend_ref_flag and isp_flag are both 0 (i.e., zero reference line is used and no sub-block partition is performed), there is no need to encode mpm_flag, and the position of the optimal mode in the MPM list is directly encoded.

With regard to the construction of the MPM list and MIP_MPM list, in VVC luma intra prediction, if the optimal mode selected by the current luma block is a non-MIP mode, a MPM list containing six most probable non-MIP modes needs to be constructed. If the optimal mode selected by the current luma block is a MIP mode, a MIP_MPM list containing three most probable MIP modes needs to be constructed.

Figure 4:
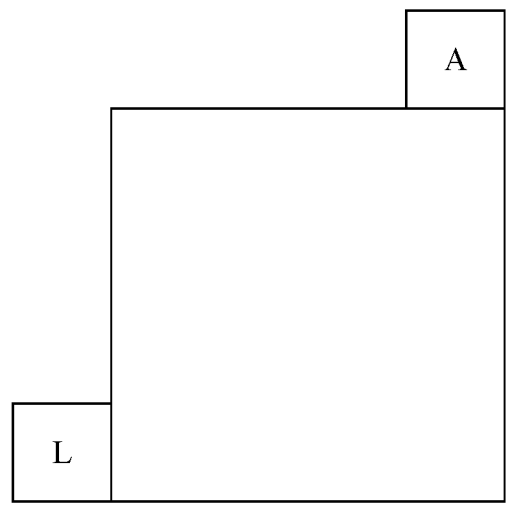
FIG. 4 is a schematic diagram of arrangement of an above adjacent picture block and a left adjacent picture block of a luma picture block of a current block.

Here, FIG. 4 is a schematic diagram of arrangement of an above adjacent picture block and a left adjacent picture block of a luma picture block of a current block. As shown in FIG. 4, the above two lists are both derived according to the optimal modes of the above adjacent picture block (A) and the left adjacent picture block (L) of the current luma block (equivalent to the luma picture block of the current block mentioned hereinafter) shown in FIG. 4.

Figure 5:
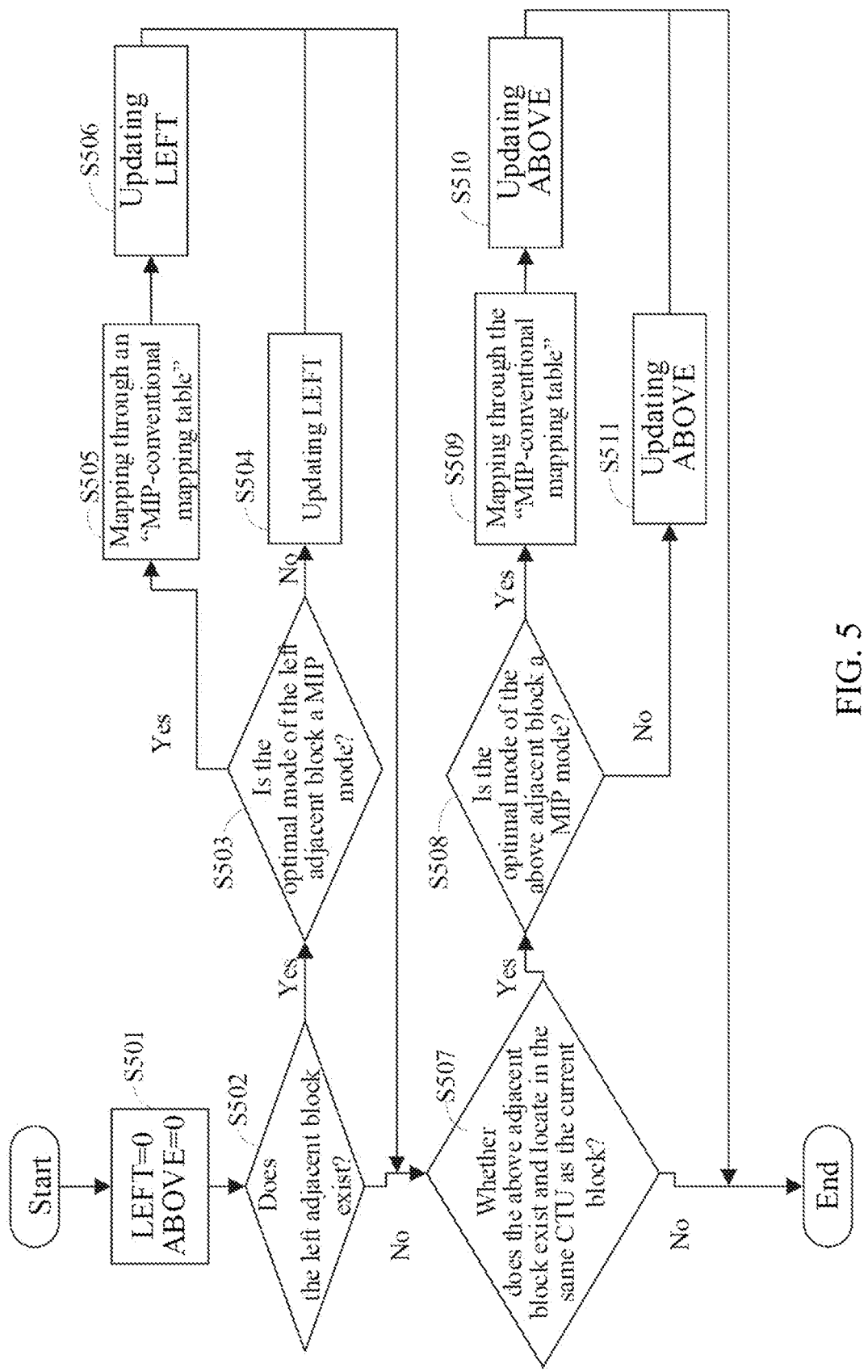
FIG. 5 is a schematic flow chart of an acquisition method of ABOVE and LEFT.

Specifically, for the construction of the MPM list, in VVC intra prediction, if the optimal mode of the current luma block is a non-MIP mode, the MPM list needs to be constructed. In the process of constructing the MPM list, the non-MIP mode ABOVE corresponding to the optimal mode of the above adjacent block and the non-MIP mode LEFT corresponding to the optimal mode of the left adjacent block need to be acquired first. FIG. 5 is a schematic flow chart of an acquisition method of ABOVE and LEFT. As shown in FIG. 5, the acquisition method may include:

S501, initializing the non-MIP mode LEFT corresponding to the optimal mode of the left adjacent block and the non-MIP mode ABOVE corresponding to the optimal mode of the above adjacent block as default values, wherein LEFT=0 and ABOVE=0, and executing S502;

S502, determining whether the left adjacent block exists, if the left adjacent block exists, executing S503, and if the left adjacent block does not exist, executing S507;

S503, determining whether the optimal mode of the left adjacent block is a MIP mode, if so, executing S505, and if not, executing S504;

S504, updating LEFT with a value of the mode of the left adjacent block, and executing S507;

S505, mapping the optimal mode through an "MIP-conventional mapping table", and executing S506;

S506, updating LEFT with the value after mapping, and executing S507;

S507, determining whether the above adjacent block exists, and determining whether the above adjacent block is in the same Coding Tree Unit (CTU) as the current block, if so in both cases, executing S508, otherwise, ending.

S508, determining whether the optimal mode of the above adjacent block is a MIP mode, if so, executing S509, and if not, executing S511;

S509, mapping the optimal mode through the "MIP-conventional mapping table", and executing S510;

S510, updating ABOVE with the value after mapping, and ending.

S511, updating ABOVE with the value of the mode of the above adjacent block, and ending.

After LEFT and ABOVE are acquired, the MPM list is constructed according to the following method, in which the number of Planar mode is 0, the number of DC mode is 1, the number of vertical mode is 50, and the number of horizontal mode is 18.

If LEFT and ABOVE are both non-angle modes:
MPMlist={Planar, DC, VER, HOR, VER−4, VER+4}.

If one of LEFT and ABOVE is an angle mode (equivalent to the directional intra prediction mode mentioned hereinafter) and the other is a non-angle mode, MAX is set to be the mode number (i.e., the number of the angle mode) of one of them with a larger number:
MPMlist={Planar, MAX, DC, MAX−1, MAX+1, MAX−2}.

If LEFT and ABOVE are both angle modes and are different, MAX is set to be the mode number of one of them with a larger number.

If a difference between LEFT and ABOVE is between 2 and 66:
MPMlist={Planar, LEFT, ABOVE, DC, MAX−1, MAX+1};
otherwise,
MPMlist={Planar, LEFT, ABOVE, DC, MAX−2, MAX+2}.

If LEFT and ABOVE are the same angle modes:
MPMlist={Planar, LEFT, LEFT−1, LEFT+1, DC, LEFT−2}.

Figure 6:
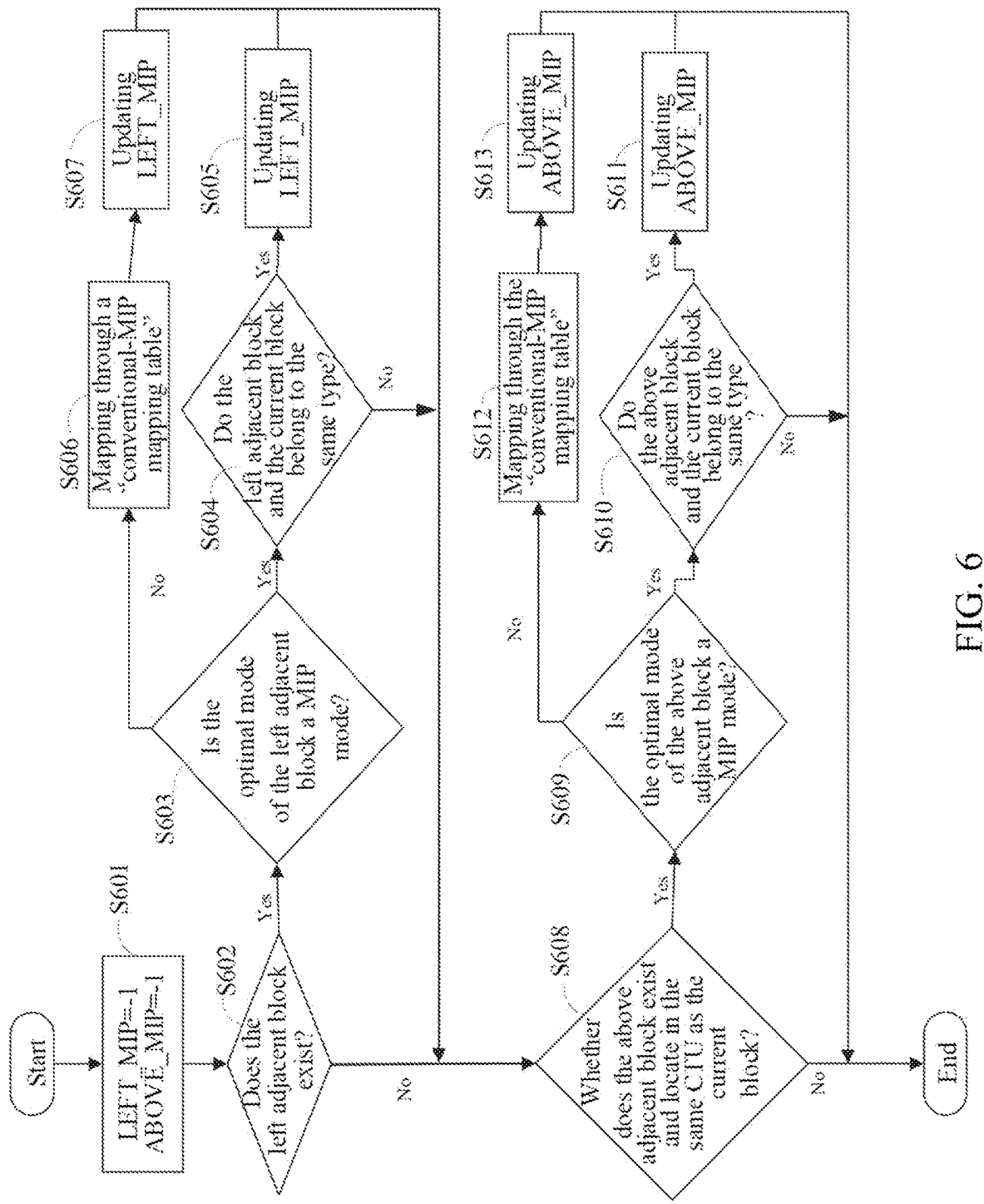
FIG. 6 is a schematic flow chart of an acquisition method of ABOVE_MIP and LEFT_MIP.

In addition, with regard to the construction of the MIP_MPM list, in VVC intra prediction, if the optimal mode of the current luma block is a MIP mode, the MIP_MPM list needs to be constructed. In the process of constructing the MIP_MPM list, the MIP mode ABOVE_MIP corresponding to the optimal mode of the above adjacent block and the MIP mode LEFT_MIP corresponding to the optimal mode of the left adjacent block need to be acquired first. FIG. 6 is a schematic flow chart of an acquisition method of ABOVE_MIP and LEFT_MIP. As shown in FIG. 6, the acquisition method may include:

S601, initializing LEFT_MIP and ABOVE_MIP as a default value −1 (unavailable), wherein LEFT_MIP=−1 and ABOVE_MIP=−1, and executing S602;

S602, determining whether the left adjacent block exists, if the left adjacent block exists, executing S603, and if the left adjacent block does not exist, executing S608;

S603, determining whether the optimal mode of the left adjacent block is a MIP mode, if so, executing S604, and if not, executing S606;

S604, determining whether the type of the left adjacent block is the same as the type of the current block, if the type of the left adjacent block is the same as the type of the current block, executing S605, and if the type of the left adjacent block is different from the type of the current block, executing S608;

S605, updating LEFT_MIP with a value of the mode of the left adjacent block, and executing S608;

S606, mapping the optimal mode through a "conventional-MIP mapping table", and executing S607;

S607, updating LEFT_MIP with a value after mapping, and executing S608;

S608, determining whether the above adjacent block exists, and determining whether the above adjacent block is in the same CTU as the current block, if so in both cases, executing S609, otherwise, ending.

S609, determining whether the optimal mode of the above adjacent block is a MIP mode, if so, executing S610, and if not, executing S612;

S610, determining whether the type of the above adjacent block is the same as the type of the current block, if the type of the above adjacent block is the same as the type of the current block, executing S611, and if the type of the above adjacent block is different from the type of the current block, ending;

S611, updating ABOVE_MIP with a value of the mode of the above adjacent block, and ending;

S612, mapping the optimal mode through the "conventional-MIP mapping table", and executing S613;

S613, updating ABOVE_MIP with a value after mapping, and ending.

In addition, after LEFT_MIP and ABOVE_MIP are acquired, a MIP_MPM list containing three most probable MIP_MPM modes is constructed according to the following method, in which the numbers in MIP_MPM are the numbers of the MIP modes, ranging from 0 to (M−1), with the first-type luma blocks being numbered 0-34, the second-type luma blocks being numbered 0-18, and the third-type luma blocks being numbered 0-10:

if LEFT_MIP is available (being not −1), putting LEFT_MIP into MIP_MPMlist;

if ABOVE_MIP is available (being not −1), after ABOVE_MIP passes redundancy check, putting ABOVE_MIP into MIP_MPMlist; and if LEFT_MIP is unavailable (being −1) and ABOVE_MIP is unavailable (being −1), after a default list passes redundancy check, adding the default list into MIP_MPMlist according to the type of the current block until MIP_MPMlist is complete:

the default list of the first-type luma blocks is: {17, 34, 5};

the default list of the second-type luma blocks is: {0, 7, 16}; and the default list of the third-type luma blocks is: {1, 4, 6}.

Figure 7:
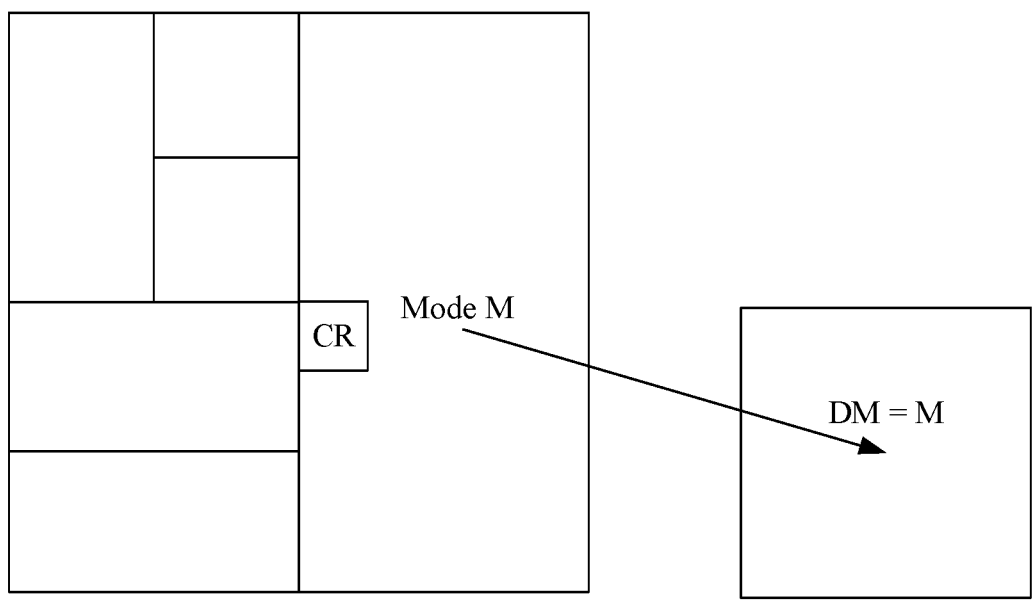
FIG. 7 is a schematic diagram of arrangement for determining a DM mode.

It should be illustrated here that there is a Direct Mode (DM) using inter-component correlation in VVC chroma intra prediction process, which may use the intra prediction mode of the center position of a co-located luma block corresponding to the current luma block to perform intra prediction of a current chroma block. FIG. 7 is a schematic diagram of arrangement for determining a DM mode. As shown in FIG. 7, since the MIP technology is only used in luma blocks, when the intra prediction mode at the CR position in FIG. 7 is a MIP mode, the MIP mode needs to be mapped to a non-MIP mode through the "MIP-conventional mapping table" to perform intra prediction of the current chroma block.

That is, due to the introduction of the MIP technology, in the process of intra prediction, a non-MIP mode needs be mapped to a MIP mode in constructing a MIP_MPM list, and a MIP mode needs to be mapped to a non-MIP mode in constructing a MPM list and determining a DM mode.

However, in practical application, as can be seen from FIG. 6, mapping from a non-MIP mode to a MIP mode needs to be used in the construction process of the MIP_MPM list, and a non-MIP mode is mapped to a MIP mode specifically through the "conventional-MIP mapping table". Specifically, 65 angle modes (No. 2-66) are first mapped to 33 angle modes (No. 2-34) through the following Table 1 ("65-33 mapping table"), and the numbers of non-angle modes remain unchanged. The "65-33 mapping table" is shown in Table 1 below:

TABLE 1

| Conventional mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Angle mode | 0 | 1 | 2 | 2 | 3 | 3 | 4 | 4 | 5 | 5 | 6 | 6 | 7 | 7 | 8 | 8 | 9 |
| Conventional mode | 17 | 18 | 19 | 20 | 21 | 22 | 23 | 24 | 25 | 26 | 27 | 28 | 29 | 30 | 31 | 32 | 33 |
| Angle mode | 9 | 10 | 10 | 11 | 11 | 12 | 12 | 13 | 13 | 14 | 14 | 15 | 15 | 16 | 16 | 17 | 17 |
| Conventional mode | 34 | 35 | 36 | 37 | 38 | 39 | 40 | 41 | 42 | 43 | 44 | 45 | 49 | 47 | 48 | 49 | 50 |
| Angle mode | 18 | 18 | 19 | 19 | 20 | 20 | 21 | 21 | 22 | 22 | 23 | 23 | 24 | 24 | 25 | 25 | 26 |
| Conventional mode | 51 | 52 | 53 | 54 | 55 | 56 | 57 | 58 | 59 | 60 | 61 | 62 | 63 | 64 | 65 | 66 | |
| Angle mode | 26 | 27 | 27 | 28 | 28 | 29 | 29 | 30 | 30 | 31 | 31 | 32 | 32 | 33 | 33 | 34 | |

Then, 33 angle modes are converted into 35/19/11 MIP modes through the "conventional-MIP mapping table". For the three types of luma blocks, three "conventional-MIP mapping tables" are shown in Table 2, Table 3 and Table 4.

TABLE 2

| Angle mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| MIP mode | 17 | 17 | 17 | 9 | 9 | 9 | 9 | 17 | 17 | 17 | 17 | 17 | 17 | 17 | 5 | 5 | 5 | 5 |
| Angle mode | 18 | 19 | 20 | 21 | 22 | 23 | 24 | 25 | 26 | 27 | 28 | 29 | 30 | 31 | 32 | 33 | 34 | |
| MIP mode | 34 | 22 | 22 | 22 | 22 | 34 | 34 | 34 | 34 | 34 | 34 | 34 | 26 | 26 | 26 | 26 | 26 | |

TABLE 3

| Angle mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| MIP mode | 0 | 0 | 10 | 10 | 10 | 10 | 10 | 4 | 6 | 7 | 7 | 7 | 5 | 5 | 0 | 0 | 3 | 3 |
| Angle mode | 18 | 19 | 20 | 21 | 22 | 23 | 24 | 25 | 26 | 27 | 28 | 29 | 30 | 31 | 32 | 33 | 34 | |
| MIP mode | 12 | 12 | 12 | 12 | 14 | 14 | 14 | 16 | 16 | 16 | 15 | 13 | 1 | 1 | 1 | 1 | 1 | |

TABLE 4

| Angle mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| MIP mode | 5 | 1 | 3 | 3 | 3 | 3 | 0 | 0 | 0 | 4 | 4 | 4 | 5 | 1 | 1 | 1 | 1 | 1 |
| Angle mode | 18 | 19 | 20 | 21 | 22 | 23 | 24 | 25 | 26 | 27 | 28 | 29 | 30 | 31 | 32 | 33 | 34 | |
| MIP mode | 6 | 6 | 6 | 6 | 6 | 10 | 10 | 9 | 9 | 9 | 9 | 9 | 8 | 8 | 8 | 8 | 8 | |

In addition, mapping from MIP mode to non-MIP mode needs to be used in the construction of MPM list and the acquisition of DM mode. Specifically, 35/19/11 MIP modes are mapped to 67 conventional modes through the "MIP-conventional mapping table". For the three types of luma blocks, three "MIP-conventional mapping tables" are shown in Table 5, Table 6 and Table 7.

TABLE 5

| MIP mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Conventional mode | 0 | 18 | 18 | 0 | 18 | 0 | 12 | 0 | 18 | 2 | 18 | 12 | 18 | 18 | 1 | 18 | 18 | 0 |
| MIP mode | 18 | 19 | 20 | 21 | 22 | 23 | 24 | 25 | 26 | 27 | 28 | 29 | 30 | 31 | 32 | 33 | 34 | |
| Conventional mode | 0 | 50 | 0 | 50 | 0 | 56 | 0 | 50 | 66 | 50 | 56 | 50 | 50 | 1 | 50 | 50 | 50 | |

TABLE 6

| MIP mode | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|---|
| Conventional mode | 0 | 1 | 0 | 1 | 0 | 22 | 18 | 18 | 1 | 0 | 1 | 0 | 1 | 0 | 44 | 0 | 50 | 1 | 0 |

TABLE 7

| MIP mode | 0 | 1 | 2 | 3 | 4 | 5 | 6 | 7 | 8 | 9 | 10 |
|---|---|---|---|---|---|---|---|---|---|---|---|
| Conventional mode | 1 | 1 | 1 | 1 | 18 | 0 | 1 | 0 | 1 | 50 | 0 |

It should be noted that the conventional modes in Table 1-Table 7 above are equivalent to the non-MIP modes in the implementations of the present disclosure.

Figure 8:
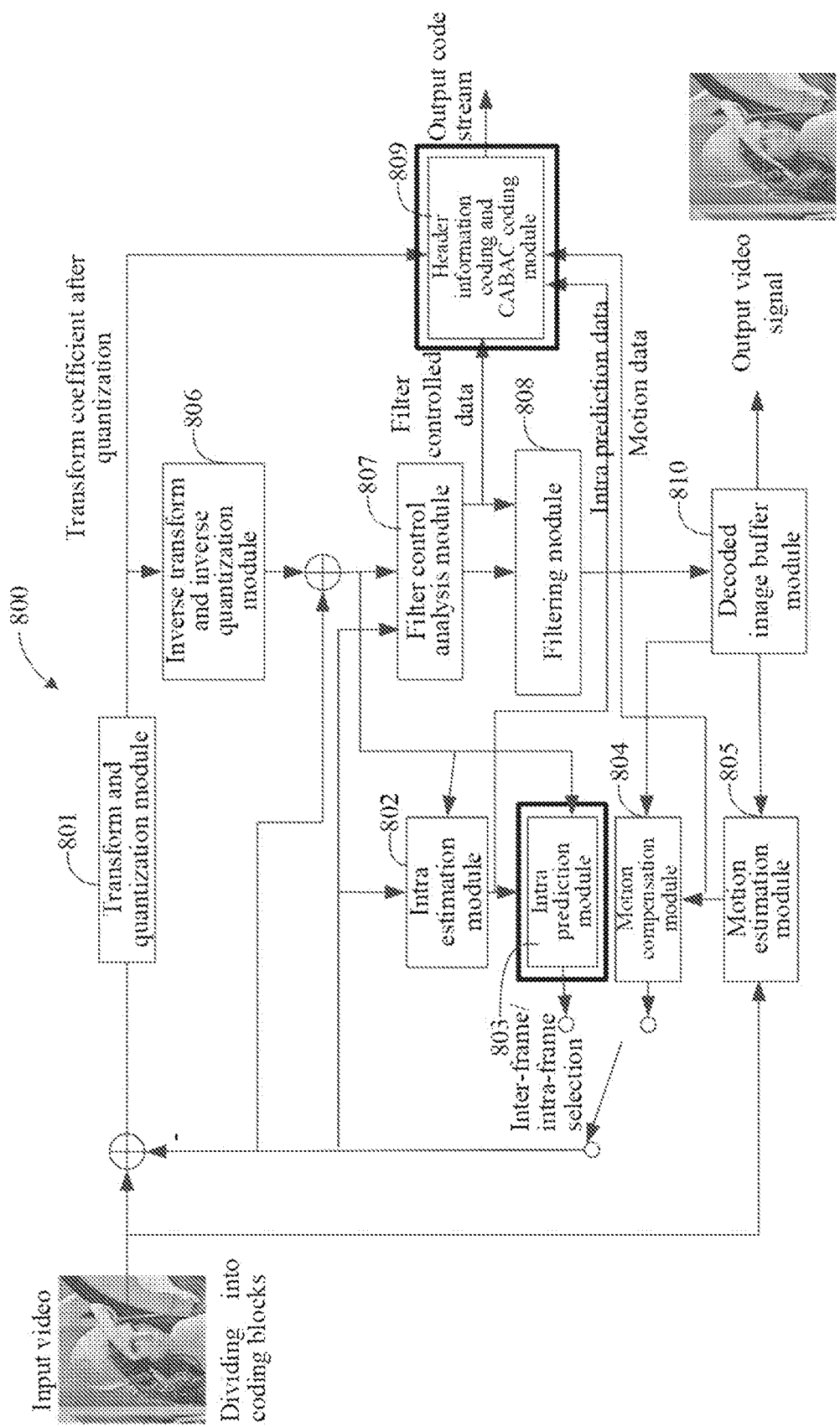
FIG. 8 is a schematic structural diagram of a video coding system.
Figure 9:
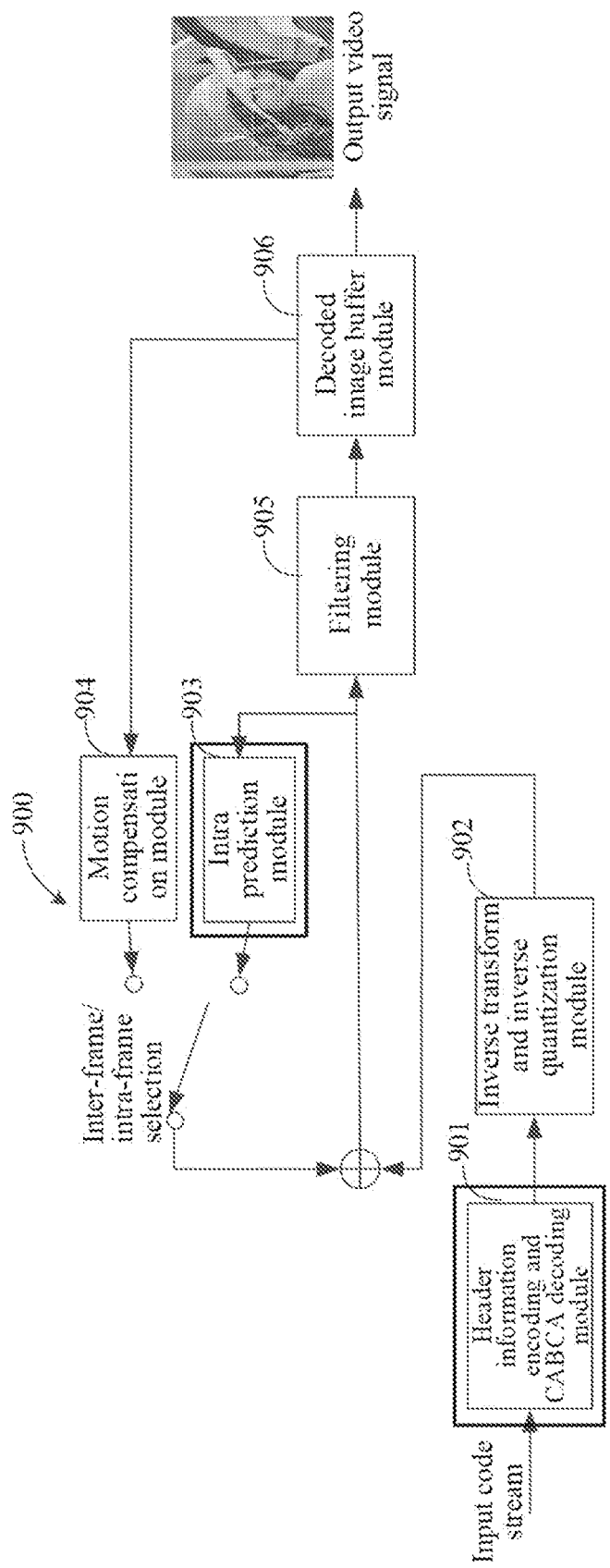
FIG. 9 is a schematic structural diagram of a video decoding system.

FIG. 8 is a schematic structural diagram of a video coding system. As shown in FIG. 8, the video coding system 800 includes components such as a transform and quantization module 801, an intra estimation module 802, an intra prediction module 803, a motion compensation module 804, a motion estimation module 805, an inverse transform and inverse quantization module 806, a filter control analysis module 807, a deblocking filtering and Sample Adaptive Offset (SAO) filtering module 808, a header information coding and Context-based Adaptive Binary Arithmetic Coding (CABAC) coding module 809, and a decoded picture buffer module 810. FIG. 9 is a schematic structural diagram of a video decoding system. As shown in FIG. 9, the video decoding system 900 includes components such as a header information decoding and CABAC decoding module 901, an inverse transform and inverse quantization module 902, an intra prediction module 903, a motion compensation module 904, a deblocking filtering and SAO filtering module 905, and a decoded picture buffer module 906. After a video picture is processed by the parts in the video coding system 800, such as the transform and quantization module 801, the intra estimation module 802, the intra prediction module 803, the motion compensation module 804, the motion estimation module 805, the deblocking filtering and SAO filtering module 808 and the header information coding and CABAC module 809, a bitstream of the video picture is output. The bitstream is input into the video decoding system 900 and processed by the parts in the video decoding system 900, such as the header information decoding and CABAC decoding module 901, the inverse transform and inverse quantization module 902, the intra prediction module 903 and the motion compensation module 904, and is finally restored to the original video picture.

The "MIP-conventional mapping tables" and "conventional-MIP mapping tables" mentioned above are mainly used in the intra prediction module 803 and the header information coding and CABAC coding module 809 in video coding, and the intra prediction module 903 and the header information coding and CABAC decoding module 909 in video decoding, and act simultaneously on the encoding end and the decoding end.

On the basis of the introduction of MIP technology, in VVC, mapping between non-MIP modes and MIP modes needs to be performed. Specifically, in the process of constructing a MIP_MPM list, mapping from non-MIP modes to MIP modes needs to be performed through the "65-33 mapping table" and "conventional-MIP mapping table"; and in the processes of constructing a MPM list and acquiring a DM mode, MIP modes need to be mapped to non-MIP modes through the "MIP-conventional mapping table". However, the mapping processes are very complicated, which increases the complexity. At the same time, since all tables needed for mapping have to be stored at both the encoding end and the decoding end, certain memory space is occupied.

Figure 10:
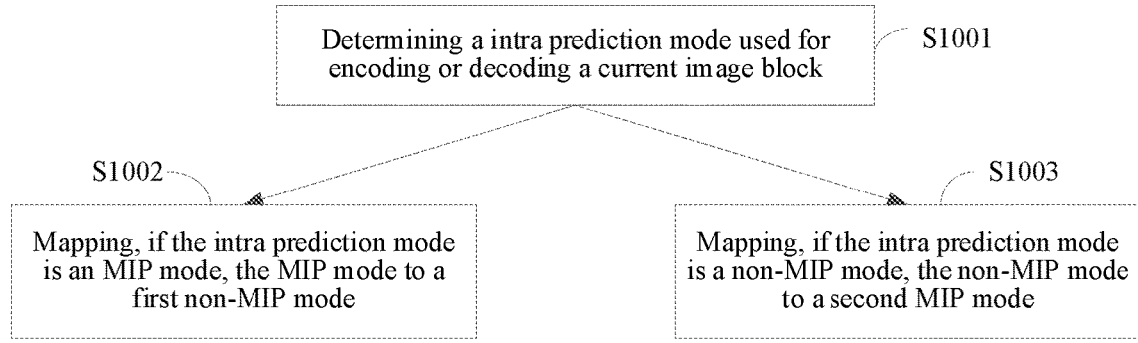
FIG. 10 is a schematic flow chart of an alternative mapping method according to an implementation of the present disclosure.

An implementation of the present disclosure provides a mapping method. FIG. 10 is a schematic flow chart of an alternative mapping method according to an implementation of the present disclosure. As shown in FIG. 10, the method may be used in an encoder or a decoder, and the method may include:

S1001, determining an intra prediction mode used for encoding or decoding a current block;

S1002, mapping, if the intra prediction mode is a MIP mode, the MIP mode to a first non-MIP mode; and S1003, mapping, if the intra prediction mode is a non-MIP mode, the non-MIP mode to a second MIP mode, wherein non-MIP modes include a direct current intra prediction mode DC, a planar intra prediction mode Planar and a directional intra prediction mode; the first non-MIP mode is one of the non-MIP modes preset before encoding or decoding the current block, and the second MIP mode is one of MIP modes preset before encoding or decoding the current block.

The directional prediction mode may be 65 angle prediction modes numbered 2-66.

It should be noted that the above-mentioned current block may be called the current to-be-encoded picture block when the encoder executes encoding, and may be called the current to-be-decoded picture block when the decoder executes decoding, which is not specifically limited in the implementations of the present disclosure.

In view of the complexity of mapping, in order to reduce the complexity of mapping to improve the encoding and decoding rates, when mapping is performed between MIP modes and non-MIP modes, for example, when mapping is performed from MIP modes to non-MIP modes, the MIP modes are directly mapped to pre-specified modes in the MIP modes, or when mapping is performed from non-MIP modes to MIP modes, the non-MIP modes are directly mapped to pre-specified modes in the MIP modes, thus reducing encoding and decoding complexity caused by multiple queries using mapping tables and improving encoding and decoding rates.

It should be noted that in practical application, mapping from MIP modes to non-MIP modes may include mapping from MIP modes to non-MIP modes during determination of the DM mode, and may also include mapping from MIP modes to non-MIP modes in constructing the MPM list; and mapping from non-MIP modes to MIP modes may be mapping from non-MIP modes to MIP modes at the time of constructing the MIP_MPM list. The above mapping methods may be described below according to three usage scenarios.

First, in the process of determining the DM mode, in order to determine the intra prediction mode of co-located chroma components, in an alternative implementation, S1002 may include:

mapping the intra prediction mode for encoding or decoding an luma component of the current block to the first non-MIP mode, when determining that the intra prediction mode for encoding or decoding the luma component of the current block belongs to MIP modes; and determining the first non-MIP mode as the intra prediction mode for encoding or decoding the chroma component of the current block, to encode or decode the chroma component of the current block.

Here, in practical application, if the intra prediction mode of the luma component is known and the intra prediction mode belongs to MIP modes, mapping is no longer performed through the "MIP-conventional mapping table", and the DM mode is directly acquired as the first non-MIP mode, for example, the first non-MIP mode may be Planar or DC, and the chroma component of the current block is predicted.

At the time of constructing the MPM list, in order to reduce the complexity of mapping, in an alternative implementation, S1002 may include:

acquiring a left adjacent picture block and an above adjacent picture block of the current block from encoded or decoded picture blocks of the current block;

when the optimal intra prediction mode of the left adjacent picture block belongs to MIP modes, mapping the optimal intra prediction mode of the left adjacent picture block to a first non-MIP mode, and updating a value of the non-MIP mode LEFT corresponding to the optimal intra prediction mode of the left adjacent picture block with a value of the first non-MIP mode;

when the above adjacent picture block is in the same CTU as the current block and the optimal intra prediction mode of the above adjacent picture block belongs to MIP modes, mapping the optimal intra prediction mode of the above adjacent picture block to a first non-MIP mode, and updating a value of the non-MIP mode ABOVE corresponding to the optimal intra prediction mode of the above adjacent picture block with a value of the first non-MIP mode; and constructing a MPM list according to the value of LEFT and the value of ABOVE to encode or decode the current block.

Specifically, first, the left adjacent picture block and the above adjacent picture block are acquired, and whether the left adjacent picture block exists is determined first. When the left adjacent picture block does not exist, the initial default value 0 of LEFT is maintained. If the left adjacent picture block exists and the optimal intra prediction mode of the left adjacent picture block belongs to MIP modes, in order to reduce the complexity of mapping, here, no mapping table is used for completing the mapping, instead, the optimal intra prediction mode of the left adjacent picture block is directly mapped to the first non-MIP mode, and the value of LEFT is updated with the value of the first non-MIP mode. In this way, the value of LEFT may be determined. The value of LEFT obtained here may be the initial default value, or may be a value obtained after updating the initial default value.

Then whether the above adjacent picture block exists is determined. If the above adjacent picture block exists and is in the same CTU as the current block, and the optimal intra prediction mode of the above adjacent picture block belongs to MIP modes, at this time, mapping is needed; and in order to reduce the complexity of mapping, no mapping table is used here for completing mapping, but the optimal intra prediction mode of the above adjacent picture block is directly mapped to the first non-MIP mode, and the value of ABOVE is updated with the value of the first non-MIP mode. In this way, the value of ABOVE may be determined. The value of ABOVE obtained here may be the initial default value, or may be a value obtained after updating the initial default value.

Finally, the MPM list is constructed with the value of LEFT and the value of ABOVE.

In addition, at the time of constructing the MPM list, in order to reduce the complexity of mapping, in an alternative implementation, S1002 may include:

acquiring a left adjacent picture block and an above adjacent picture block of the current block from encoded or decoded picture blocks of the current block;

when the optimal intra prediction mode of the left adjacent picture block belongs to MIP modes, prohibiting mapping and maintaining the value of LEFT as a default value;

when the above adjacent picture block is in the same CTU as the current block and the optimal intra prediction mode of the above adjacent picture block belongs to MIP modes, prohibiting mapping and maintaining the value of ABOVE as a default value; and constructing a MPM list according to the value of LEFT and the value of ABOVE, to encode or decode the current block.

Here, after the left adjacent picture block and the above adjacent picture block are acquired, when it is determined that the optimal intra prediction mode of the left adjacent picture block belongs to MIP modes, no mapping table is used, moreover, the MIP mode is not mapped, that is, mapping is prohibited, then the value of LEFT is still the initial default value 0, this is equivalent to mapping the MIP mode to Planar with the first non-MIP mode of 0. Similarly, when it is determined that the above adjacent picture block is in the same CTU as the current block and the optimal intra prediction mode belongs to MIP modes, mapping is prohibited, and this is equivalent to mapping the MIP mode to Planar with the first non-MIP mode of 0, then the value of ABOVE is still the initial default value 0.

Finally, the MPM list is constructed with the value of LEFT and the value of ABOVE.

In addition, for the cases where mapping is not needed, in an alternative implementation, after acquiring the left adjacent picture block and the above adjacent picture block of the current block from encoded or decoded picture blocks of the current block, and before constructing a MPM list according to the value of LEFT and the value of ABOVE to encode or decode the current block, the method further includes:

updating the value of LEFT with the value of the optimal intra prediction mode of the left adjacent picture block, when the optimal intra prediction mode of the left adjacent picture block belongs to non-MIP modes; and updating the value of ABOVE with the value of the optimal intra prediction mode of the above adjacent picture block, when the above adjacent picture block is in the same CTU as the current block and the optimal intra prediction mode of the above adjacent picture block belongs to non-MIP modes.

That is, when the optimal intra prediction mode of the left adjacent picture block belongs to non-MIP modes, there is no need to perform mapping, and the value of LEFT may be updated directly with the value of the optimal intra prediction mode of the left adjacent picture block. Similarly, when the above adjacent picture block is in the same CTU as the current block and the optimal intra prediction mode of the above adjacent picture block belongs to non-MIP modes, there is no need to perform mapping, and the value of ABOVE may be updated directly with the value of the optimal intra prediction mode of the above adjacent picture block.

Figure 11:
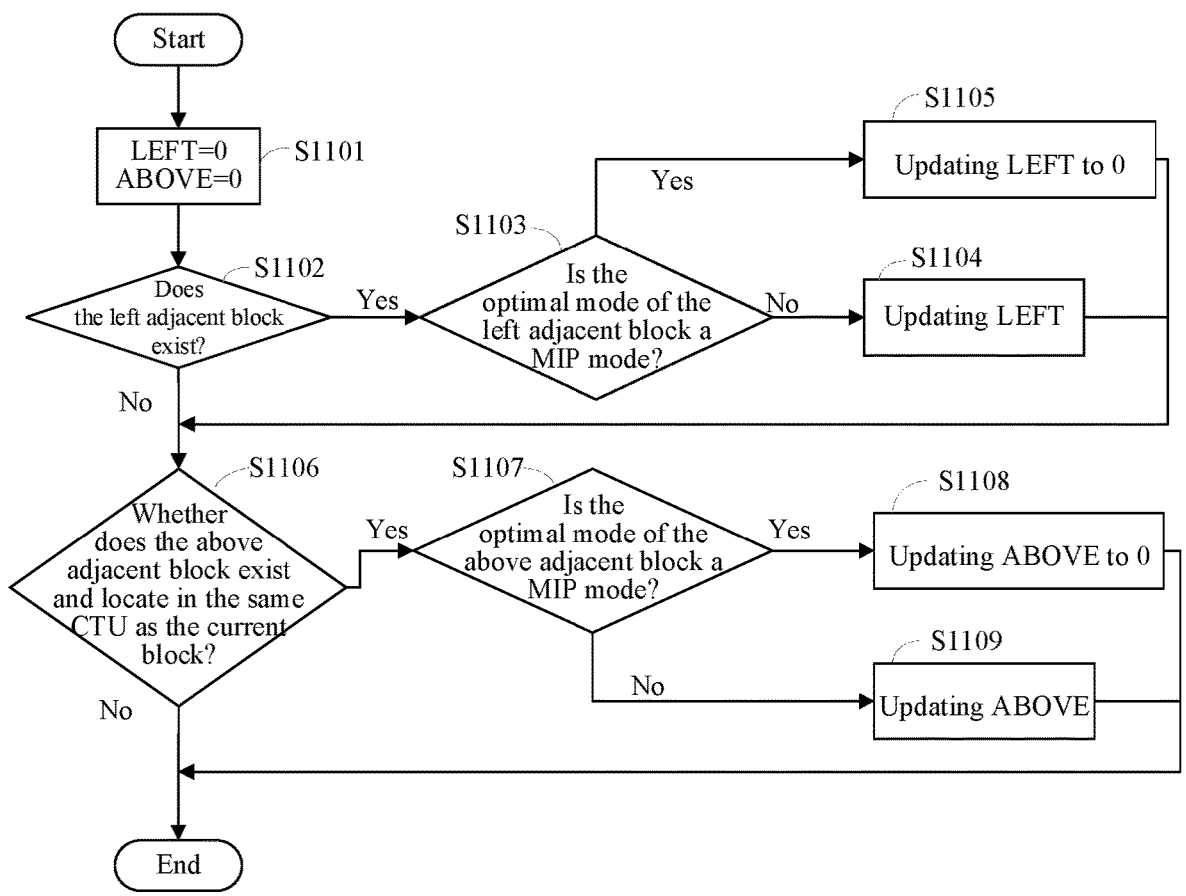
FIG. 11 is a schematic flow chart of an alternative example of acquiring LEFT and ABOVE according to an implementation of the present disclosure.

Taking the case as an example where the first mode is the Planar mode, FIG. 11 is a schematic flow chart of an alternative example of acquiring LEFT and ABOVE according to an implementation of the present disclosure. As shown in FIG. 11, the method may include:

S1101, initializing LEFT and ABOVE as default value 0, LEFT=0, ABOVE=0, and executing S1102;

S1102, determining whether the left adjacent block (equivalent to the above left adjacent picture block) exists, if the left adjacent block exists, executing S1103, and if the left adjacent block does not exist, executing S1106;

S1103, determining whether the optimal mode (equivalent to the above optimal intra prediction mode) of the left adjacent block is a MIP mode, if so, executing S1105, otherwise, executing S1104;

S1104, updating the value of LEFT with the value of the left adjacent block (equivalent to the above left adjacent picture block) at which the optimal mode is a non-MIP mode, and executing S1106;

S1105, updating the value of LEFT to 0, and executing S1106;

S1106, determining whether the above adjacent block exists, and determining whether the above adjacent block is in the same CTU as the current block (equivalent to the above current block), if the above adjacent block exists and is in the same CTU as the current block, executing S1107, otherwise, ending.

S1107, determining whether the optimal mode of the above adjacent block is a MIP mode, if so, executing S1108, and if not, executing S1109;

S1108, updating the value of ABOVE to 0, and ending.

S1109, updating the value of ABOVE with the value of the optimal mode of the above adjacent block, and ending.

Figure 12:
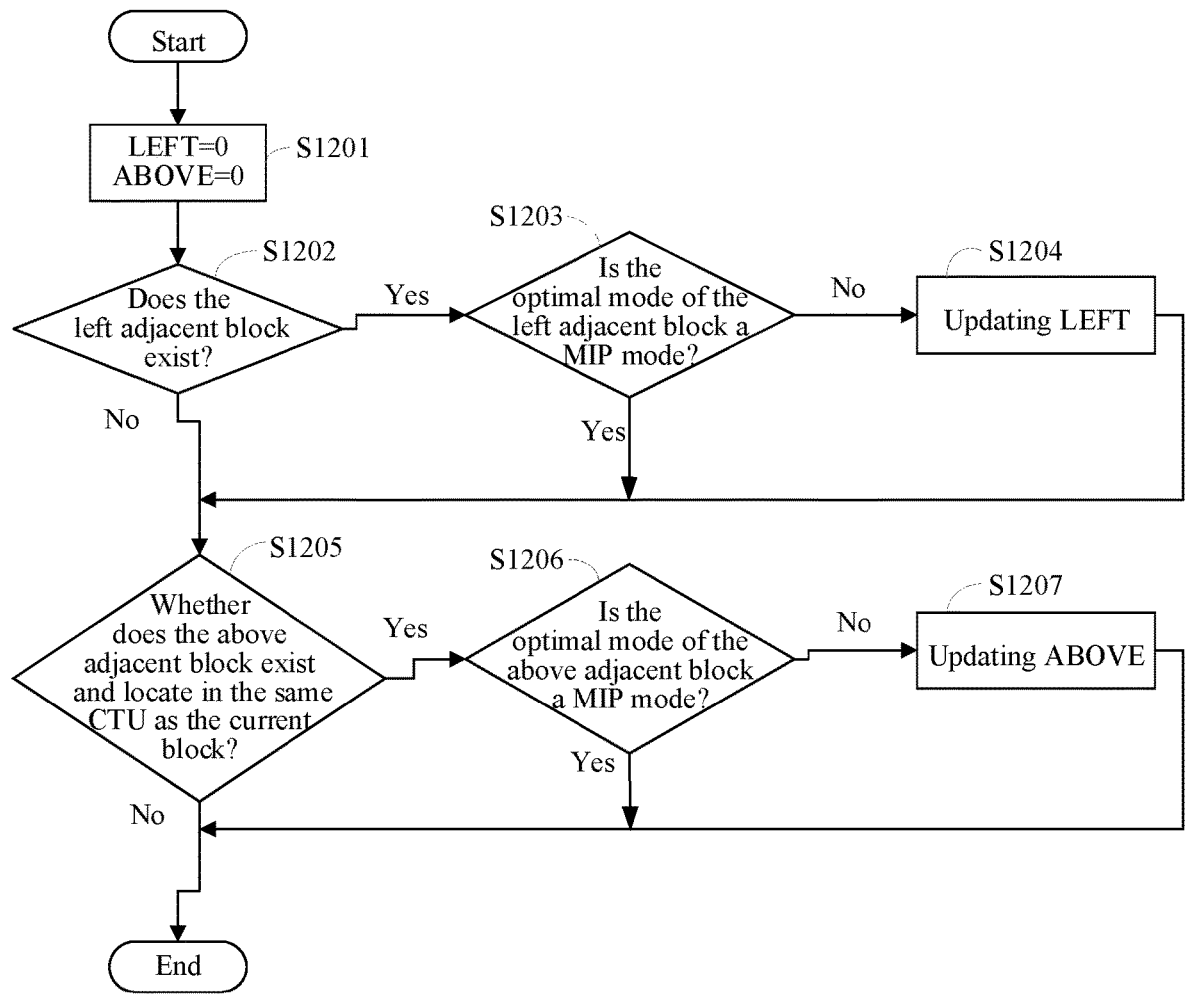
FIG. 12 is a schematic flow chart of another alternative example of acquiring LEFT and ABOVE according to an implementation of the present disclosure.

Since the default values of LEFT and ABOVE are 0 in the construction process of the MPM list, FIG. 11 may be modified to obtain FIG. 12. FIG. 12 is a schematic flow chart of another alternative example of acquiring LEFT and ABOVE according to an implementation of the present disclosure. As shown in FIG. 12, the method may include:

S1201, initializing LEFT and ABOVE to the default value 0, LEFT=0, ABOVE=0, and executing S1202;

S1202, determining whether the left adjacent block exists, if the left adjacent block exists, executing S1203, and if the left adjacent block does not exist, executing S1205;

S1203, determining whether the optimal mode of the left adjacent block is a MIP mode, if so, executing S1205, and if not, executing S1204;

S1204, updating the value of LEFT with the value of the optimal mode of the left adjacent block, and executing S1205;

S1205, determining whether the above adjacent block exists, and determining whether the above adjacent block is in the same CTU as the current block, if the above adjacent block exists and is in the same CTU as the current block, executing S1206, otherwise, ending.

S1206, determining whether the optimal mode of the above adjacent block is a MIP mode, if so, ending, and if not, executing S1207;

S1207, updating the value of ABOVE with the value of the optimal mode of the above adjacent block, and ending.

At the time of constructing the MIP_MPM list, in order to reduce the complexity of mapping, in an alternative implementation, S1003 may include:

acquiring the left adjacent picture block and the above adjacent picture block of the current block from encoded or decoded picture blocks of the current block;

when the optimal intra prediction mode of the left adjacent picture block belongs to non-MIP modes, mapping the optimal intra prediction mode of the left adjacent picture block to a second MIP mode, and updating the value of the MIP mode LEFT_MIP corresponding to the optimal intra prediction mode of the left adjacent picture block with the value of the second MIP mode;

when the above adjacent picture block is in the same CTU as the current block and the optimal intra prediction mode of the above adjacent picture block belongs to non-MIP modes, mapping the optimal intra prediction mode of the above adjacent picture block to a second MIP mode, and updating the value of the MIP mode ABOVE_MIP corresponding to the optimal intra prediction mode of the above adjacent picture block with the value of the second MIP mode; and constructing the MIP_MPM list according to the value of LEFT_MIP and the value of ABOVE_MIP, to encode or decode the current block.

Here, after acquiring the left adjacent picture block and the above adjacent picture block, when it is first determined that the left adjacent picture block belongs to non-MIP modes, in order to avoid using a mapping table, the optimal intra prediction mode of the left adjacent picture block is mapped to the second MIP mode, and the value of LEFT- _MIP is updated with the value of the second MIP mode. Similarly, when it is determined that the above adjacent picture block is in the same CTU as the current block and the optimal intra prediction mode of the above adjacent picture block belongs to non-MIP modes, the optimal intra prediction mode of the above adjacent picture block is mapped to the second MIP mode, and the value of ABOVE_MIP is updated with the value of the second MIP mode. Finally, the MIP_MPM list is constructed using the value of LEFT_MIP and the value of ABOVE_MIP to implement encoding or decoding.

In this way, the non-MIP mode is directly mapped to the pre-specified MIP mode without using a complicated mapping table, which reduces the complexity of mapping and therefore improves encoding and decoding rates.

At the time of constructing the MIP_MPM list, in order to reduce the complexity of mapping, in an alternative implementation, S1003 may include:

acquiring a left adjacent picture block and an above adjacent picture block of the current block from encoded or decoded picture blocks of the current block;

when the optimal intra prediction mode of the left adjacent picture block belongs to non-MIP modes, determining a second MIP mode according to the type of the current block, mapping the optimal intra prediction mode of the left adjacent picture block to the second MIP mode, and updating the value of LEFT_MIP with the value of the second MIP mode;

when the above adjacent picture block is in the same CTU as the current block and the optimal intra prediction mode of the above adjacent picture block belongs to the non-MIP modes, determining a second MIP mode according to the type of the current block, mapping the optimal intra prediction mode of the above adjacent picture block to the second MIP mode, and updating the value of ABOVE_MIP with the value of the second MIP mode; and constructing the MIP_MPM list according to the value of LEFT_MIP and the value of ABOVE_MIP, to encode or decode the current block.

That is, after acquiring the left adjacent picture block and the above adjacent picture block, if it is determined that the optimal intra prediction mode of the left adjacent picture block belongs to non-MIP modes, mapping is needed at this time, and the second MIP mode may be determined first according to the type of the current block. For example, when the current block belongs to the first-type luma blocks, there is a corresponding MIP mode; when the current block belongs to the second-type luma blocks, there is a corresponding MIP mode; and when the current block belongs to the third-type luma blocks, there is a corresponding MIP mode. Thus, the corresponding MIP mode, i.e., the second MIP mode, may be determined first according to the type of the current block, and then the non-MIP mode is mapped to the determined corresponding second MIP mode, and the value of LEFT_MIP is updated with the value of the corresponding second MIP mode. The method for the above adjacent picture block is similar to that for the left adjacent picture block, which will not be repeated here.

Finally, the MIP_MPM list is constructed using the value of LEFT_MIP and the value of ABOVE_MIP to complete encoding and decoding of the current block.

At the time of constructing the MIP_MPM list, in order to reduce the complexity of mapping, in an alternative implementation, S1003 may include:

acquiring a left adjacent picture block and an above adjacent picture block of the current block from encoded or decoded picture blocks of the current block;

when the optimal intra prediction mode of the left adjacent picture block belongs to non-MIP modes, prohibiting mapping and maintaining the value of LEFT_MIP as the default value;

when the optimal intra prediction mode of the above adjacent picture block belongs to the non-MIP modes, prohibiting mapping and maintaining the value of ABOVE_MIP as the default value; and constructing the MIP_MPM list according to the value of LEFT_MIP and the value of ABOVE_MIP, to encode or decode the current block.

Here, after obtaining the left adjacent picture block and the above adjacent picture block, if it is determined that the optimal intra prediction mode of the left adjacent picture block belongs to the non-MIP modes, mapping is directly prohibited at this time, and since the default value of LEFT_MIP is −1, LEFT_MIP is made to be equal to −1; similarly, for the above adjacent picture block, when mapping is needed, mapping is prohibited and LEFT_MIP is made to be equal to −1, so that both LEFT_MIP and LEFT_MIP are unavailable, then, according to the type of the current block, a default list may be added to MIP_MPM list after passing redundancy check until MIP_MPM list is complete, thus constructing the MIP_MPM list. In this way, the complexity of encoding and decoding caused by adaptation to the mapping table is avoided.

In addition, at the time of constructing the MIP_MPM list, for the case where mapping is not needed, in an alternative implementation, after acquiring the left adjacent picture block and the above adjacent picture block of the current block from the encoded or decoded picture blocks of the current block, and before constructing the MIP_MPM list according to the value of LEFT_MIP and the value of ABOVE_MIP to encode or decode the current block, the method further includes:

when the optimal intra prediction mode of the left adjacent picture block belongs to MIP modes and the type of the left adjacent picture block is the same as that of the current block, updating the value of LEFT_MIP with the value of the optimal intra prediction mode of the left adjacent picture block; and when the above adjacent picture block is in the same CTU as the current block, and the optimal intra prediction mode of the above adjacent picture block belongs to MIP modes, and the type of the above adjacent picture block is the same as that of the current block, updating the value of ABOVE_MIP with the value of the optimal intra prediction mode of the above adjacent picture block.

That is, when the optimal intra prediction mode of the left adjacent picture block belongs to MIP modes, and the type of the left adjacent picture block is the same as that of the current block, mapping is not needed, and the value of LEFT_MIP is updated directly with the value of the optimal intra prediction mode of the left adjacent picture block. Similarly, for the above adjacent picture block, when mapping is not needed, the value of ABOVE_MIP is updated directly with the value of the optimal intra prediction mode of the above adjacent picture block.

In this way, the updated LEFT_MIP value and the updated ABOVE_MIP value may be obtained to construct the MIP_MPM list.

In addition, at the time of constructing the MIP_MPM list, for the case where mapping is not needed, in an alternative implementation, after acquiring the left adjacent picture block and the above adjacent picture block of the current block from the encoded or decoded picture blocks of the current block, and before constructing the MIP_MPM list according to the value of LEFT_MIP and the value of ABOVE_MIP to encode or decode the current block, the method further includes:

when the optimal intra prediction mode of the left adjacent picture block belongs to MIP modes and the type of the left adjacent picture block is different from that of the current block, updating the value of LEFT_MIP to the value of a second MIP mode or maintaining the value of LEFT_MIP as the default value; and when the above adjacent picture block is in the same CTU as the current block, the optimal intra prediction mode of the above adjacent picture block belongs to MIP modes and the type of the above adjacent picture block is different from that of the current block, updating the value of ABOVE_MIP to the value of the second MIP mode or maintaining the value of ABOVE_MIP as the default value.

Here, for the left adjacent picture block, when the optimal intra prediction mode of the left adjacent picture block belongs to MIP modes, and the type of the left adjacent picture block is different from that of the current block, mapping is not needed. Here, the value of LEFT_MIP may be updated to the value of the second MIP mode, or the value of LEFT_MIP may be maintained as the default value, to realize updating of the value of LEFT_MIP, which is beneficial to the construction of the MIP_MPM list. Similarly, for the above adjacent picture block, when the above adjacent picture block is in the same CTU as the current block, and the optimal intra prediction mode of the above adjacent picture block belongs to MIP modes, and the type of the above adjacent picture block is different from that of the current block, mapping is not needed. Here, the value of ABOVE_MIP may be updated to the value of the second MIP mode, or the value of ABOVE_MIP may be maintained as the default value to realize updating of the value of ABOVE_MIP, which is beneficial to the construction of the MIP_MPM list.

Figure 13:
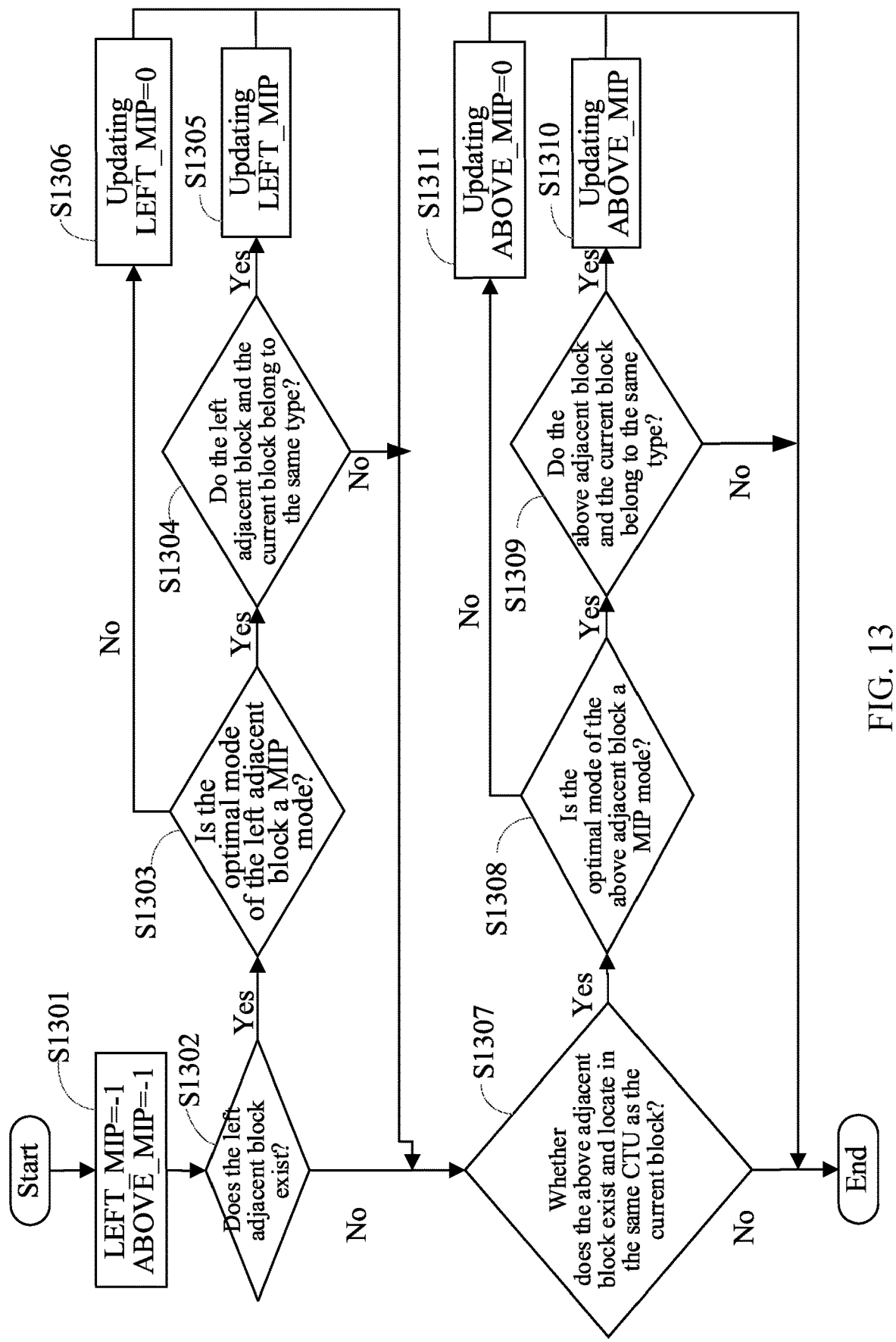
FIG. 13 is a schematic flow chart of an alternative example of acquiring LEFT_MIP and ABOVE_MIP according to an implementation of the present disclosure.

Taking the case as an example where the second mode is Planar mode, FIG. 13 is a schematic flow chart of an alternative example of acquiring LEFT_MIP and ABOVE_MIP according to an implementation of the present disclosure. As shown in FIG. 13, the method may include:

S1301, initializing LEFT_MIP and ABOVE_MIP as default value −1, LEFT_MIP=−1 and ABOVE_MIP=−1, and executing S1302;

S1302, determining whether the left adjacent block exists, if the left adjacent block exists, executing S1303, and if the left adjacent block does not exist, executing S1307;

S1303, determining whether the optimal mode of the left adjacent block is a MIP mode, if so, executing S1304, and if not, executing S1306.

S1304, determining whether the type of the left adjacent block is the same as the type of the current block, if the type of the left adjacent block is the same as the type of the current block, executing S1305, and if the type of the left adjacent block is different from the type of the current block, executing S1307;

S1305, updating the value of LEFT_MIP with the value of the optimal mode of the left adjacent block, and executing S1307;

S1306, updating the value of LEFT_MIP to 0, and executing S1307;

S1307, determining whether the above adjacent block exists, and determining whether the above adjacent block is in the same CTU as the current block, if the above adjacent block exists and is in the same CTU as the current block, executing S1308, otherwise, ending.

S1308, determining whether the optimal mode of the above adjacent block is a MIP mode, if so, executing S1309, and if not, executing S1311;

S1309, determining whether the type of the above adjacent block is the same as the type of the current block, if the type of the above adjacent block is the same as the type of the current block, executing S1310, and if the type of the above adjacent block is different from the type of the current block, ending.

S1310, updating the value of ABOVE_MIP with the value of the optimal mode of the above adjacent block, and ending.

S1311, updating the value of ABOVE_MIP to 0, and ending.

Figure 14:
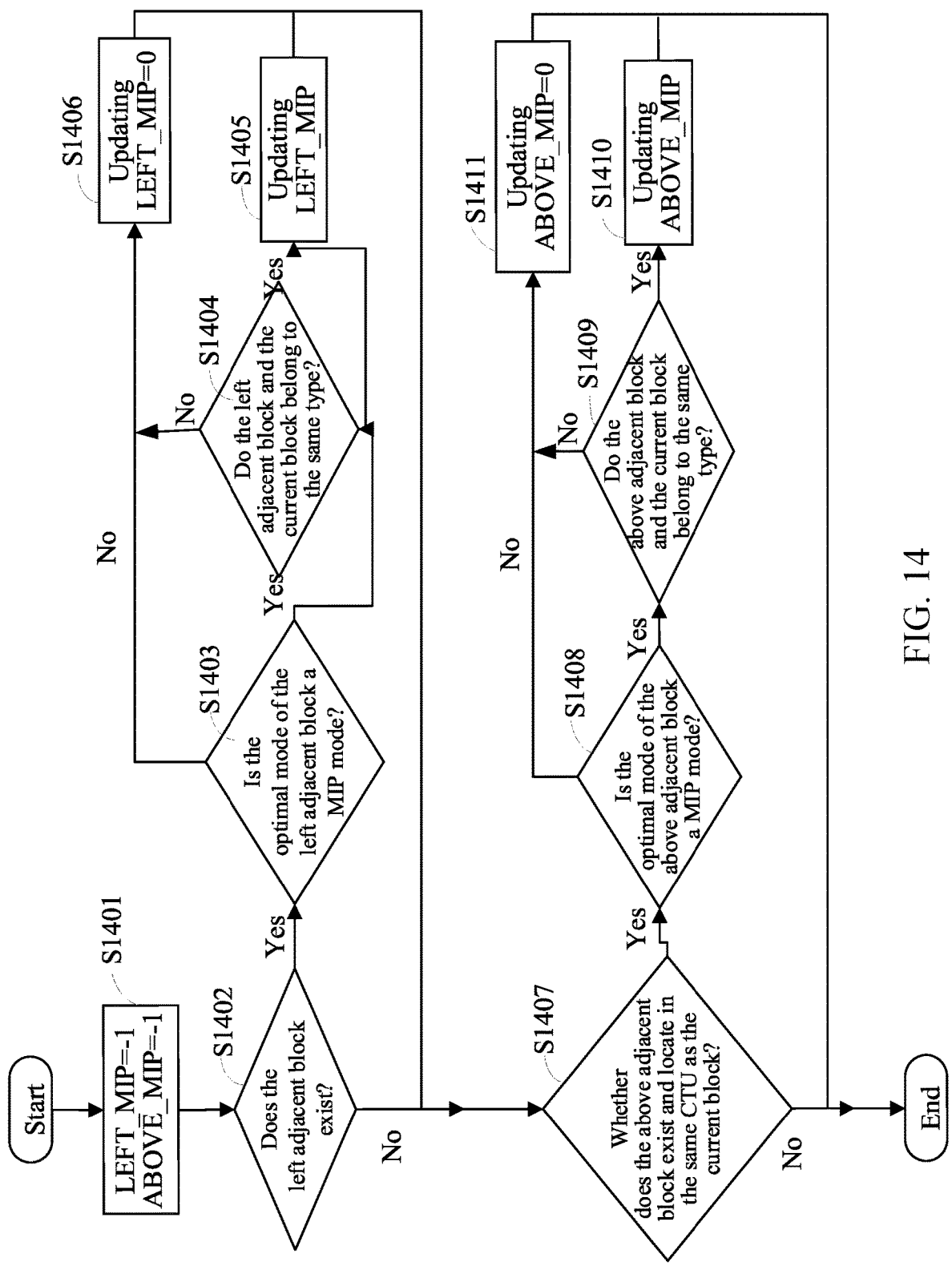
FIG. 14 is a schematic flow chart of another alternative example of acquiring LEFT_MIP and ABOVE_MIP according to an implementation of the present disclosure.

Still taking the case as an example where the second mode is Planar mode, FIG. 14 is a schematic flow chart of another alternative example of acquiring LEFT_MIP and ABOVE_MIP according to an implementation of the present disclosure. As shown in FIG. 14, the method may include:

S1401, initializing LEFT_MIP and ABOVE_MIP as default value −1, LEFT_MIP=−1 and ABOVE_MIP=−1, and executing S1402;

S1402, determining whether the left adjacent block exists, if the left adjacent block exists, executing S1403, and if the left adjacent block does not exist, executing S1407;

S1403, determining whether the optimal mode of the left adjacent block is a MIP mode, if so, executing S1404, and if not, executing S1406;

S1404, determining whether the type of the left adjacent block is the same as the type of the current block, if the type of the left adjacent block is the same as the type of the current block, executing S1405, and if the type of the left adjacent block is different from the type of the current block, executing S1406;

S1405, updating the value of LEFT_MIP with the value of the optimal mode of the left adjacent block, and executing S1407;

S1406, updating the value of LEFT_MIP to 0, and executing S1407;

S1407, determining whether the above adjacent block exists, and determining whether the above adjacent block is in the same CTU as the current block, if the above adjacent block exists and is in the same CTU as the current block, executing S1408, otherwise, ending.

S1408, determining whether the optimal mode of the above adjacent block is a MIP mode, if so, executing S1409, and if not, executing S1411;

S1409, determining whether the type of the above adjacent block is the same as the type of the current block, if the type of the above adjacent block is the same as the type of the current block, executing S1410, and if the type of the above adjacent block is different from the type of the current block, executing S1411;

S1410, updating the value of ABOVE_MIP is updated with the value of the optimal mode of the above adjacent block, and ending.

S1411, updating the value of ABOVE_MIP to 0, and ending.

In addition, at the time of constructing the MIP_MPM list, for the case where mapping is not needed, in an alternative implementation, after acquiring the left adjacent picture block and the above adjacent picture block of the current block from the encoded or decoded picture blocks of the current block, and before constructing the MIP_MPM list according to the value of LEFT_MIP and the value of ABOVE_MIP to encode or decode the current block, the method further includes:

when the optimal intra prediction mode of the left adjacent picture block belongs to MIP modes, and the type of the left adjacent picture block is different from that of the current block, determining a second MIP mode according to the type of the left adjacent picture block and the type of the current block, and updating the value of LEFT_MIP with the value of the second MIP mode; and when the above adjacent picture block is in the same CTU as the current block, and the optimal intra prediction mode of the above adjacent picture block belongs to MIP modes, and the type of the left adjacent picture block is different from the type of the current block, determining the second MIP mode according to the type of the above adjacent picture block and the type of the current block, and updating the value of ABOVE_MIP with the value of the second MIP mode.

Here, for the scenarios where mapping is not needed, the second MIP mode may be determined according to a combination type of the type of the left adjacent picture block and the type of the current block. For example, when the left adjacent picture block is a first-type luma block and the current block is a second-type luma value, the corresponding second mode is Planar mode. When the left adjacent picture block is a first-type luma block and the current block is a third-type luma value, the corresponding second MIP mode is DC mode. Similarly, the values of the second MIP modes corresponding to different types of combinations may be determined in advance to determine the second MIP mode, and then when mapping is not needed, the value of LEFT_MIP and the value of ABOVE_MIP are updated with the value of the second MIP mode.

It should be noted that the mapping used in the DM mode and in the construction of the MPM list and the mapping used in the construction of the MIP_MPM list may be combined into multiple encoding and decoding methods, which all belong to the scope protected by the present disclosure. Here, the combination manner is not elaborated in the implementations of the present disclosure.

In addition, the mapping used in the DM mode and in the construction of the MPM list and the mapping used in the construction of the MIP_MPM list in the implementations of the present disclosure may be applied not only to an encoder, but also to a decoder, which will not be described in detail here.

An implementation of the present disclosure provides a mapping method, which may be applied to an encoder or a decoder. The method may include: determining an intra prediction mode used at the time of encoding or decoding a current block; mapping, if the intra prediction mode is a MIP mode, the MIP mode to a first non-MIP mode; and mapping, if the intra prediction mode is a non-MIP mode, the non-MIP mode to a second MIP mode, wherein the non-MIP mode includes a direct current intra prediction mode, a planar intra prediction mode and a directional intra prediction mode, the first non-MIP mode is one of the non-MIP modes preset before encoding or decoding the current block, and the second MIP mode is one of the MIP modes preset before encoding or decoding the current block. That is, in the implementations of the present disclosure, the type of intra prediction mode is known by determining the intra prediction mode used at the time of encoding or decoding the current block. When the intra prediction mode used is a MIP mode, the MIP mode is mapped to one of the preset non-MIP modes, and when the intra prediction mode used is a MIP mode, the MIP mode is mapped to one of preset MIP modes. In this way, query in multiple mapping tables in the existing mapping methods is avoided, and there is no need to store all the tables needed for mapping, which saves memory space, reduces the complexity of mapping between the MIP mode and the conventional mode, can quickly realize the mapping between the MIP mode and the conventional mode, and improves the encoding and decoding rates.

Implementation II

Figure 15:
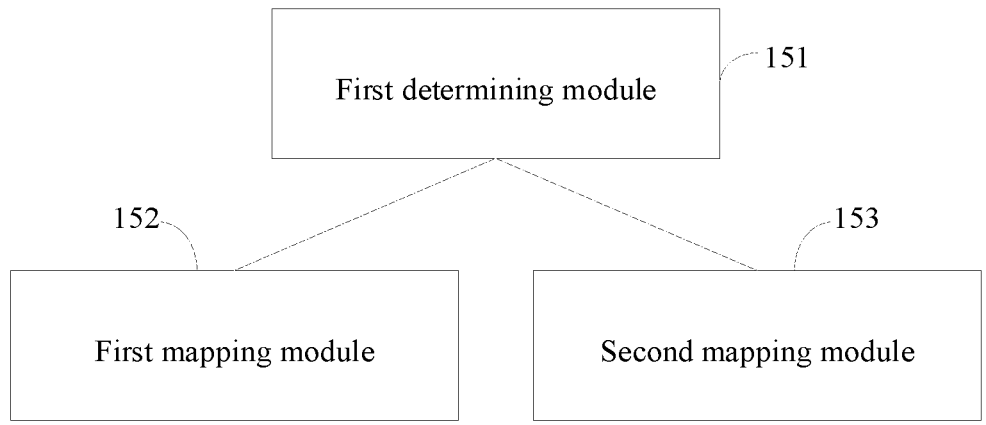
FIG. 15 is a schematic structural diagram of an alternative encoder according to an implementation of the present disclosure.

Based on the same inventive concept, FIG. 15 is a schematic structural diagram of an alternative encoder according to an implementation of the present disclosure. As shown in FIG. 15, the encoder according to an implementation of the present disclosure may include a first mapping module 151.

a first determining module 151 configured to determine an intra prediction mode used for encoding a current block;

a first mapping module 152 configured to map, if the intra prediction mode is a MIP mode, the MIP mode to a first non-MIP mode; and a second mapping module 153 configured to map, if the intra prediction mode is a non-MIP mode, the non-MIP mode to a second MIP mode, wherein non-MIP modes include a direct current intra prediction mode, a planar intra prediction mode and a directional intra prediction mode; the first non-MIP mode is one of the non-MIP modes preset before encoding the current block, and the second MIP mode is one of the MIP modes preset before encoding the current block.

Further, in an implementation of the present disclosure, the first mapping module 152 is specifically configured to:

map an intra prediction mode for encoding an luma component of the current block to a first non-MIP mode, when determining that the intra prediction mode for encoding the luma component of the current block belongs to MIP modes; and determine the first non-MIP mode as the intra prediction mode for encoding the chroma component of the current block, to encode the chroma component of the current block.

Further, the first mapping module 152 is specifically configured to:

acquire a left adjacent picture block and an above adjacent picture block of the current block from encoded picture blocks of the current block;

when the optimal intra prediction mode of the left adjacent picture block belongs to MIP modes, map the optimal intra prediction mode of the left adjacent picture block to a first non-MIP mode, and update a value of the non-MIP mode LEFT corresponding to the optimal intra prediction mode of the left adjacent picture block with a value of the first non-MIP mode;

when the above adjacent picture block is in the same CTU as the current block and the optimal intra prediction mode of the above adjacent picture block belongs to MIP modes, map the optimal intra prediction mode of the above adjacent picture block to a first non-MIP mode, and update a value of the non-MIP mode ABOVE corresponding to the optimal intra prediction mode of the above adjacent picture block with a value of the first non-MIP mode; and construct a MPM list according to the value of LEFT and the value of ABOVE to encode the current block.

Further, the first mapping module 152 is specifically configured to:
  acquire a left adjacent picture block and an above adjacent picture block of the current block from encoded picture blocks of the current block;
  when the optimal intra prediction mode of the left adjacent picture block belongs to MIP modes, prohibit mapping and maintain the value of non-MIP mode LEFT corresponding to the optimal intra prediction mode of the left adjacent picture block as a default value;
  when the above adjacent picture block is in the same CTU as the current block and the optimal intra prediction mode of the above adjacent picture block belongs to MIP modes, prohibit mapping and maintain the value of non-MIP mode ABOVE corresponding to the optimal intra prediction mode of the above adjacent picture block as a default value; and
  construct a MPM list according to the value of LEFT and the value of ABOVE, to encode the current block.

Further, the first mapping module 152 is also specifically configured to:
  after acquiring the left adjacent picture block and the above adjacent picture block of the current block from encoded picture blocks of the current block, and before constructing a MPM list according to the value of LEFT and the value of ABOVE to encode the current block, when the optimal intra prediction mode of the left adjacent picture block belongs to non-MIP modes, update the value of LEFT with the value of the optimal intra prediction mode of the left adjacent picture block; and
  when the above adjacent picture block is in the same CTU as the current block and the optimal intra prediction mode of the above adjacent picture block belongs to non-MIP modes, update the value of ABOVE with the value of the optimal intra prediction mode of the above adjacent picture block.

Further, the second mapping module 153 is specifically configured to:
  acquire the left adjacent picture block and the above adjacent picture block of the current block from encoded picture blocks of the current block;
  when the optimal intra prediction mode of the left adjacent picture block belongs to non-MIP modes, map the optimal intra prediction mode of the left adjacent picture block to a second MIP mode, and update the value of the MIP mode LEFT_MIP corresponding to the optimal intra prediction mode of the left adjacent picture block with the value of the second MIP mode;
  when the above adjacent picture block is in the same CTU as the current block and the optimal intra prediction mode of the above adjacent picture block belongs to non-MIP modes, map the optimal intra prediction mode of the above adjacent picture block to a second MIP mode, and update the value of the MIP mode ABOVE_MIP corresponding to the optimal intra prediction mode of the above adjacent picture block with the value of the second MIP mode; and
  construct the MIP_MPM list according to the value of LEFT_MIP and the value of ABOVE_MIP, to encode the current block.

Further, the second mapping module 153 is specifically configured to:
  acquire a left adjacent picture block and an above adjacent picture block of the current block from encoded picture blocks of the current block;
  when the optimal intra prediction mode of the left adjacent picture block belongs to non-MIP modes, determine a second MIP mode according to the type of the current block, map the optimal intra prediction mode of the left adjacent picture block to the second MIP mode, and update the value of MIP mode LEFT_MIP corresponding to the optimal intra prediction mode of the left adjacent picture block with the value of the second MIP mode;
  when the above adjacent picture block is in the same CTU as the current block and the optimal intra prediction mode of the above adjacent picture block belongs to the non-MIP modes, determine a second MIP mode according to the type of the current block, map the optimal intra prediction mode of the above adjacent picture block to the second MIP mode, and update the value of MIP mode ABOVE_MIP corresponding to the optimal intra prediction mode of the above adjacent picture block with the value of the second MIP mode; and
  construct the MIP_MPM list according to the value of LEFT_MIP and the value of ABOVE_MIP, to encode the current block.

Further, the second mapping module 153 is specifically configured to:
  acquire a left adjacent picture block and an above adjacent picture block of the current block from encoded picture blocks of the current block;
  when the optimal intra prediction mode of the left adjacent picture block belongs to non-MIP modes, prohibit mapping and maintain the value of MIP mode LEFT_MIP corresponding to the optimal intra prediction mode of the left adjacent picture block as the default value;
  when the above adjacent picture block is in the same CTU as the current block and the optimal intra prediction mode of the above adjacent picture block belongs to the non-MIP modes, prohibit mapping and maintain the value of MIP mode ABOVE_MIP corresponding to the optimal intra prediction mode of the above adjacent picture block as the default value; and
  construct the MIP_MPM list according to the value of LEFT_MIP and the value of ABOVE_MIP, to encode the current block.

Further, the second mapping module 153 is also specifically configured to:
  after acquiring the left adjacent picture block and the above adjacent picture block of the current block from the encoded picture blocks of the current block, and before constructing the MIP_MPM list according to the value of LEFT_MIP and the value of ABOVE_MIP to encode the current block, when the optimal intra prediction mode of the left adjacent picture block belongs to MIP modes and the type of the left adjacent picture block is the same as that of the current block, update the value of LEFT_MIP with the value of the optimal intra prediction mode of the left adjacent picture block; and
  when the above adjacent picture block is in the same CTU as the current block, and the optimal intra prediction mode of the above adjacent picture block belongs to MIP modes, and the type of the above adjacent picture block is the same as that of the current block, update the value of ABOVE_MIP with the value of the optimal intra prediction mode of the above adjacent picture block.

Further, the second mapping module 153 is also specifically configured to:

after acquiring the left adjacent picture block and the above adjacent picture block of the current block from the encoded picture blocks of the current block, and before constructing the MIP_MPM list according to the value of LEFT_MIP and the value of ABOVE_MIP to encode the current block, when the optimal intra prediction mode of the left adjacent picture block belongs to MIP modes and the type of the left adjacent picture block is different from that of the current block, update the value of LEFT_MIP to the value of a second MIP mode or maintain the value of LEFT_MIP as the default value; and when the above adjacent picture block is in the same CTU as the current block, the optimal intra prediction mode of the above adjacent picture block belongs to MIP modes and the type of the above adjacent picture block is different from that of the current block, update the value of ABOVE_MIP to the value of the second MIP mode or maintain the value of ABOVE_MIP as the default value.

Further, the second mapping module 153 is also specifically configured to:

after acquiring the left adjacent picture block and the above adjacent picture block of the current block from the encoded picture blocks of the current block, and before constructing the MIP_MPM list according to the value of LEFT_MIP and the value of ABOVE_MIP to encode the current block, when the optimal intra prediction mode of the left adjacent picture block belongs to MIP modes, and the type of the left adjacent picture block is different from that of the current block, determine a second MIP mode according to the type of the left adjacent picture block and the type of the current block, and update the value of LEFT_MIP with the value of the second MIP mode; and when the optimal intra prediction mode of the above adjacent picture block belongs to MIP modes, and the type of the left adjacent picture block is different from the type of the current block, determine the second MIP mode according to the type of the above adjacent picture block and the type of the current block, and update the value of ABOVE_MIP with the value of the second MIP mode.

Figure 16:
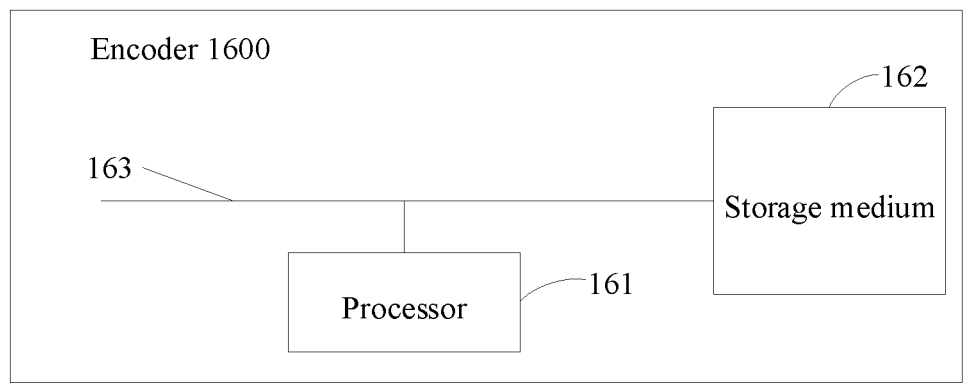
FIG. 16 is a schematic structural diagram of another alternative encoder according to an implementation of the present disclosure.

FIG. 16 is a schematic structural diagram of another alternative encoder according to an implementation of the present disclosure. As shown in FIG. 16, the encoder 1600 according to an implementation of the present disclosure may further include a processor 161 and a storage medium 162 storing instructions executable by the processor 161. The storage medium 162 relies on the processor 161 to execute an operation through a communication bus 163, and when the instructions are executed by the processor 161, the mapping method in one or more of the above implementations is executed.

It should be noted that in practical application, various components in the encoder are coupled together through the communication bus 163. It may be understood that the communication bus 163 is used for implementing connection and communication between these components. The communication bus 163 further includes a power bus, a control bus, and a status signal bus, in addition to a data bus. However, for the sake of clear description, various buses are marked as the communication bus 163 in FIG. 16.

Figure 17:
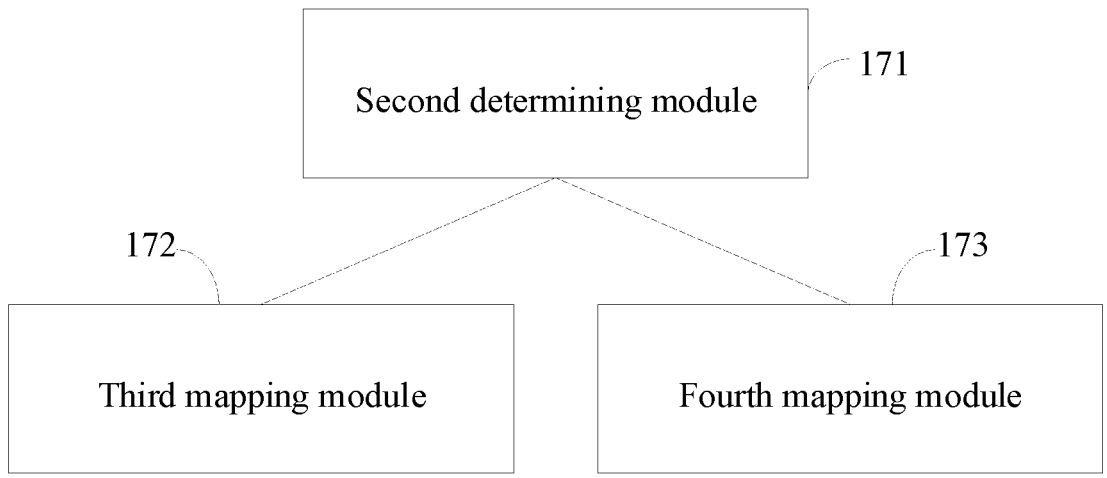
FIG. 17 is a schematic structural diagram of an alternative decoder according to an implementation of the present disclosure.

Based on the same inventive concept, FIG. 17 is a schematic structural diagram of an alternative decoder according to an implementation of the present disclosure. As shown in FIG. 17, the decoder may include:

a second determining module 171 configured to determine an intra prediction mode used for decoding a current block;

a third mapping module 172 configured to map, if the intra prediction mode is a MIP mode, the MIP mode to a first non-MIP mode; and a fourth mapping module 173 configured to map, if the intra prediction mode is a non-MIP mode, the non-MIP mode to a second MIP mode, wherein the non-MIP modes include a direct current intra prediction mode, a planar intra prediction mode and a directional intra prediction mode; the first non-MIP mode is one of the non-MIP modes preset before decoding the current block, and the second MIP mode is one of the MIP modes preset before decoding the current block.

Further, in an implementation of the present disclosure, the third mapping module 172 is specifically configured to:

map an intra prediction mode for decoding an luma component of the current block to a first non-MIP mode, when determining that the intra prediction mode for decoding the luma component of the current block belongs to MIP modes; and determine the first non-MIP mode as the intra prediction mode for decoding the chroma component of the current block, to decode the chroma component of the current block.

Further, the third mapping module 172 is specifically configured to:

acquire a left adjacent picture block and an above adjacent picture block of the current block from decoded picture blocks of the current block;

when the optimal intra prediction mode of the left adjacent picture block belongs to MIP modes, map the optimal intra prediction mode of the left adjacent picture block to a first non-MIP mode, and update a value of the non-MIP mode LEFT corresponding to the optimal intra prediction mode of the left adjacent picture block with a value of the first non-MIP mode;

when the above adjacent picture block is in the same CTU as the current block and the optimal intra prediction mode of the above adjacent picture block belongs to MIP modes, map the optimal intra prediction mode of the above adjacent picture block to a first non-MIP mode, and update a value of the non-MIP mode ABOVE corresponding to the optimal intra prediction mode of the above adjacent picture block with a value of the first non-MIP mode; and construct a MPM list according to the value of LEFT and the value of ABOVE to decode the current block.

Further, the third mapping module 172 is specifically configured to:

acquire a left adjacent picture block and an above adjacent picture block of the current block from encoded picture blocks of the current block;

when the optimal intra prediction mode of the left adjacent picture block belongs to MIP modes, prohibit mapping and maintain the value of non-MIP mode LEFT corresponding to the optimal intra prediction mode of the left adjacent picture block as a default value;

when the above adjacent picture block is in the same CTU as the current block and the optimal intra prediction mode of the above adjacent picture block belongs to MIP modes, prohibit mapping and maintain the value of non-MIP mode ABOVE corresponding to the optimal intra prediction mode of the above adjacent picture block as a default value; and construct a MPM list according to the value of LEFT and the value of ABOVE, to decode the current block.

Further, the third mapping module 172 is also specifically configured to:

after acquiring the left adjacent picture block and the above adjacent picture block of the current block from decoded picture blocks of the current block, and before constructing a MPM list according to the value of LEFT and the value of ABOVE to decode the current block, when the optimal intra prediction mode of the left adjacent picture block belongs to non-MIP modes, update the value of LEFT with the value of the optimal intra prediction mode of the left adjacent picture block; and when the above adjacent picture block is in the same CTU as the current block and the optimal intra prediction mode of the above adjacent picture block belongs to non-MIP modes, update the value of ABOVE with the value of the optimal intra prediction mode of the left adjacent picture block.

Further, the fourth mapping module 173 is specifically configured to:

acquire the left adjacent picture block and the above adjacent picture block of the current block from decoded picture blocks of the current block;

when the optimal intra prediction mode of the left adjacent picture block belongs to non-MIP modes, map the optimal intra prediction mode of the left adjacent picture block to a second MIP mode, and update the value of the MIP mode LEFT_MIP corresponding to the optimal intra prediction mode of the left adjacent picture block with the value of the second MIP mode;

when the above adjacent picture block is in the same CTU as the current block and the optimal intra prediction mode of the above adjacent picture block belongs to non-MIP modes, map the optimal intra prediction mode of the above adjacent picture block to a second MIP mode, and update the value of the MIP mode ABOVE_MIP corresponding to the optimal intra prediction mode of the above adjacent picture block with the value of the second MIP mode; and construct the MIP_MPM list according to the value of LEFT_MIP and the value of ABOVE_MIP, to decode the current block.

Further, the fourth mapping module 173 is specifically configured to:

acquire a left adjacent picture block and an above adjacent picture block of the current block from encoded picture blocks of the current block;

when the optimal intra prediction mode of the left adjacent picture block belongs to non-MIP modes, determine a second MIP mode according to the type of the current block, map the optimal intra prediction mode of the left adjacent picture block to the second MIP mode, and update the value of MIP mode LEFT_MIP corresponding to the optimal intra prediction mode of the left adjacent picture block with the value of the second MIP mode;

when the above adjacent picture block is in the same CTU as the current block and the optimal intra prediction mode of the above adjacent picture block belongs to the non-MIP modes, determine a second MIP mode according to the type of the current block, map the optimal intra prediction mode of the above adjacent picture block to the second MIP mode, and update the value of MIP mode ABOVE_MIP corresponding to the optimal intra prediction mode of the above adjacent picture block with the value of the second MIP mode; and construct the MIP_MPM list according to the value of LEFT_MIP and the value of ABOVE_MIP, to decode the current block.

Further, the fourth mapping module 173 is specifically configured to:

acquire a left adjacent picture block and an above adjacent picture block of the current block from decoded picture blocks of the current block;

when the optimal intra prediction mode of the left adjacent picture block belongs to non-MIP modes, prohibit mapping and maintain the value of MIP mode LEFT_MIP corresponding to the optimal intra prediction mode of the left adjacent picture block as the default value;

when the above adjacent picture block is in the same CTU as the current block and the optimal intra prediction mode of the above adjacent picture block belongs to the non-MIP modes, prohibit mapping and maintain the value of MIP mode ABOVE_MIP corresponding to the optimal intra prediction mode of the above adjacent picture block as the default value; and construct the MIP_MPM list according to the value of LEFT_MIP and the value of ABOVE_MIP, to decode the current block.

Further, the fourth mapping module 173 is also configured to:

after acquiring the left adjacent picture block and the above adjacent picture block of the current block from the decoded picture blocks of the current block, and before constructing the MIP_MPM list according to the value of LEFT_MIP and the value of ABOVE_MIP to decode the current block, when the optimal intra prediction mode of the left adjacent picture block belongs to MIP modes and the type of the left adjacent picture block is the same as that of the current block, update the value of LEFT_MIP with the value of the optimal intra prediction mode of the left adjacent picture block; and when the above adjacent picture block is in the same CTU as the current block, and the optimal intra prediction mode of the above adjacent picture block belongs to MIP modes, and the type of the above adjacent picture block is the same as that of the current block, update the value of ABOVE_MIP with the value of the optimal intra prediction mode of the above adjacent picture block.

Further, the fourth mapping module 173 is also specifically configured to:

after acquiring the left adjacent picture block and the above adjacent picture block of the current block from the decoded picture blocks of the current block, and before constructing the MIP_MPM list according to the value of LEFT_MIP and the value of ABOVE_MIP to decode the current block, when the optimal intra prediction mode of the left adjacent picture block belongs to MIP modes and the type of the left adjacent picture block is different from that of the current block, update the value of LEFT_MIP to the value of a second MIP mode or maintain the value of LEFT_MIP as the default value; and when the above adjacent picture block is in the same CTU as the current block, the optimal intra prediction mode of the above adjacent picture block belongs to MIP modes and the type of the above adjacent picture block is different from that of the current block, update the value of ABOVE_MIP to the value of the second MIP mode or maintain the value of ABOVE_MIP as the default value.

Further, the fourth mapping module 173 is also specifically configured to:

after acquiring the left adjacent picture block and the above adjacent picture block of the current block from the decoded picture blocks of the current block, and before constructing the MIP_MPM list according to the value of LEFT_MIP and the value of ABOVE_MIP to decode the current block, when the optimal intra prediction mode of the left adjacent picture block belongs to MIP modes, and the type of the left adjacent picture block is different from that of the current block, determine a second MIP mode according to the type of the left adjacent picture block and the type of the current block, and update the value of LEFT_MIP with the value of the second MIP mode; and when the optimal intra prediction mode of the above adjacent picture block belongs to MIP modes, and the type of the left adjacent picture block is different from the type of the current block, determine the second MIP mode according to the type of the above adjacent picture block and the type of the current block, and update the value of ABOVE_MIP with the value of the second MIP mode.

Figure 18:
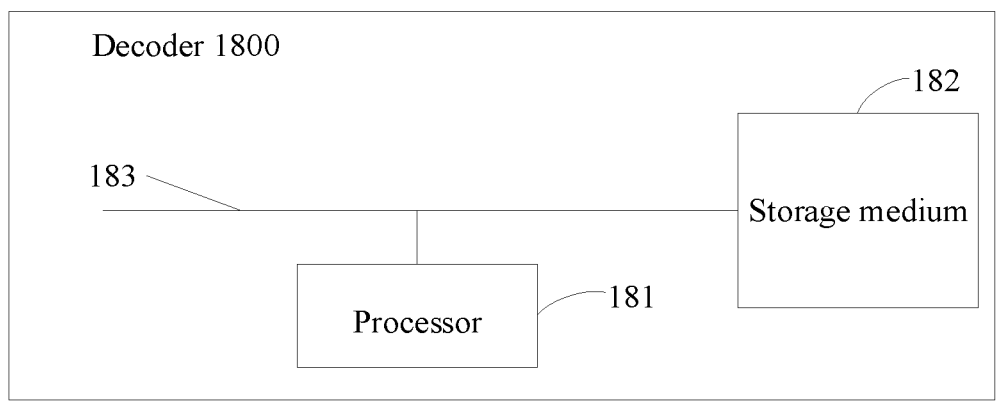
FIG. 18 is a schematic structural diagram of another alternative decoder according to an implementation of the present disclosure.

FIG. 18 is a schematic structural diagram of another alternative decoder according to an implementation of the present disclosure. As shown in FIG. 18, the decoder 1800 according to an implementation of the present disclosure may further include a processor 181 and a storage medium 182 storing instructions executable by the processor 181. The storage medium 182 relies on the processor 181 to execute an operation through a communication bus 183, and when the instructions are executed by the processor 181, the mapping method in one or more of the above implementations is executed.

It should be noted that in practical application, various components in the decoder are coupled together through the communication bus 183. It may be understood that the communication bus 183 is used for implementing connection and communication between these components. The communication bus 183 further includes a power bus, a control bus, and a status signal bus, in addition to a data bus. However, for the sake of clear description, various buses are marked as the communication bus 183 in FIG. 18.

An implementation of the present disclosure provides a computer storage medium in which executable instructions are stored. When the executable instructions are executed by one or more processors, the processors execute the mapping method in one or more of the above implementations.

It may be understood that the memory in the implementations of the present disclosure may be a transitory memory or a non-transitory memory, or may include both a transitory memory and a non-transitory memory. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. By way of exemplary but not restrictive illustrations, many forms of RAMs are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM). The memory in the systems and methods described here is intended to include, without being limited to, these and any other suitable types of memory.

The processor may be an integrated circuit chip having a signal processing capability. In an implementation process, the steps of the foregoing method implementations may be implemented by an integrated logic circuit of hardware in the processor or instructions in a form of software. The processor may be a general purpose processor, a Digital Signal Processor (DSP), an Application Specific Integrated Circuit (ASIC), a Field Programmable Gate Array (FPGA) or other programmable logic devices, a discrete gate or a transistor logic device, or a discrete hardware component. The processor may implement or execute methods, acts and logical block diagrams disclosed in the implementations of this application. The general purpose processor may be a microprocessor, or the processor may be any conventional processor or the like. The acts of the methods disclosed with reference to the implementations of this application may be directly implemented by a hardware decoding processor, or may be implemented by a combination of hardware and software modules in the decoding processor. The software modules may be located in a storage medium commonly used in the art, such as a random access memory, a flash memory, a read-only memory, a programmable read-only memory or an electrically erasable programmable memory, or a register. The storage medium is located in a memory, and the processor reads the information in the memory and completes the acts of the above methods in combination with its hardware.

It may be understood that the implementations described herein may be implemented by hardware, software, firmware, middleware, microcode or a combination thereof. For the implementation by hardware, the processing module may be implemented in one or more Application Specific Integrated Circuits (ASIC), Digital Signal Processors (DSP), DSP Devices (DSPD), Programmable Logic Devices (PLD), Field-Programmable Gate Arrays (FPGA), general-purpose processors, controllers, microcontrollers, microprocessors, other electronic modules for performing the functions described in the present disclosure, or combinations thereof.

For the implementation by software, the techniques described herein may be implemented by the modules (e.g., procedures, functions, etc.) that perform the functions described herein. Software codes may be stored in a memory and executed by a processor. The memory may be implemented in the processor or external to the processor.

It should be noted that in the specification, the terms "include", "contain" or any other variation thereof are intended to cover a non-exclusive inclusion, such that a process, method, article, or apparatus that includes a list of elements not only includes those elements but also includes other elements not expressly listed, or further includes elements inherent to such process, method, article, or apparatus. Without further restrictions, an element defined by a statement "include one . . . " does not exclude the presence of another identical element in the process, method, article or apparatus that includes the element.

The above-mentioned serial numbers of the implementations of the present disclosure are only for description, and do not represent superiority and inferiority of the implementations.

From the above description of the implementations, a person skilled in the art may clearly understand that the methods of the above implementations may be implemented by means of software plus necessary universal hardware platform, and certainly may also be implemented through hardware, but the former is a better implementation in many cases. Based on this understanding, the technical solution of the present disclosure, in essence, or the part contributing to the prior art may be embodied in the form of a software product, and the computer software product is stored in a storage medium (such as ROM/RAM, a magnetic disk, an optical disk), including a number of instructions for causing a terminal (which may be a cellphone, a computer, a server, a network device or the like) to perform the methods described in various implementations of the present disclosure.

The implementations of the present disclosure have been described above with reference to the accompanying drawings. However, the present disclosure is not limited to the above specific implementations, and the above specific implementations are only illustrative, rather than restrictive. Under the inspiration of the present disclosure, a person of ordinary skills in the art may further make many forms without departing from the spirit of the present disclosure and the scope protected by the claims, which are all within the protection of the present disclosure.

INDUSTRIAL APPLICABILITY

The implementations of the present disclosure provide a mapping method, an encoder, a decoder and a computer storage medium, in which an intra prediction mode used at the time of encoding or decoding a current block is determined, if the intra prediction mode is a MIP mode, the MIP mode is mapped to a first non-MIP mode, and if the intra prediction mode is a non-MIP mode, the non-MIP mode is mapped to a second MIP mode, thereby improving encoding and decoding rates.

The invention claimed is:

1. A method for decoding a picture, applied to a decoder, wherein the method comprises:
   determining an intra prediction mode indication for a current block;
   when the current block is of a non-Matrix-based Intra Prediction (MIP) mode, a neighboring block of the current block is of MIP mode, the MIP mode of the neighboring block is mapped to a PLANAR mode, and the PLANAR mode is used to derive a Most Probable Modes List (MPM) of the current block of the non-MIP mode, wherein the derivation includes listing the PLANAR mode as a first mode in the MPM.

2. The method according to claim 1, wherein the neighboring block comprises at least one of a left neighboring block or an above neighboring block.

3. The method according to claim 1, wherein when the current block is of the non-MIP mode, the non-MIP mode is determined as an intra prediction mode for a color component of the current block.

4. The method according to claim 3, wherein the non-MIP mode is mapped to a MIP mode, wherein the MIP mode is one of MIP modes preset before decoding the current block.

5. The method according to claim 1, wherein determining the intra prediction mode indication for the current block comprises:
   decoding prediction mode information signalled in a bitstream, wherein the prediction mode information indicates the intra prediction mode for the current block.

6. A decoder, comprises a processor and a storage medium storing instructions executable by the processor, the storage medium relying on the processor to execute an operation through a communication bus, and when the instructions are executed by the processor, the processor is configured to:
   determine an intra prediction mode indication for a current block;
   when the current block is of a non-Matrix-based Intra Prediction (MIP) mode,
   a neighboring block of the current block is of MIP mode, the MIP mode of the neighboring block is mapped to a PLANAR mode, and the PLANAR mode is used to derive a Most Probable Modes List (MPM) of the current block of the non-MIP mode, wherein the derivation includes listing the PLANAR mode as a first mode in the MPM.

7. The decoder according to claim 6, wherein the neighboring block comprises at least one of a left neighboring block or an above neighboring block.

8. The decoder according to claim 6, wherein when the current block is of the non-MIP mode, the non-MIP mode is determined as an intra prediction mode for a color component of the current block.

9. A method for encoding a picture, applied to an encoder, wherein the method comprises:
   determining an intra prediction mode for a current block;
   when the current block is of a non-Matrix-based Intra Prediction (MIP) mode,
   a neighboring block of the current block is of MIP mode, the MIP mode of the neighboring block is mapped to a PLANAR mode, and the PLANAR mode is used to derive a Most Probable Modes List (MPM) of the current block of the non-MIP mode, wherein the derivation includes listing the PLANAR mode as a first mode in the MPM.

10. The method according to claim 9, wherein the neighboring block comprises at least one of a left neighboring block or an above neighboring block.

11. The method according to claim 9, wherein when the current block is of the non-MIP mode, the non-MIP mode is determined as an intra prediction mode for a color component of the current block.

12. The method according to claim 11, wherein the non-MIP mode is mapped to a MIP mode, wherein the MIP mode is one of MIP modes preset before encoding the current block.

13. The method according to claim 9, comprising:
   writing prediction mode information into a bitstream, wherein the prediction mode information indicates the intra prediction mode for the current block.

14. An encoder, comprises a processor and a storage medium storing instructions executable by the processor, the storage medium relying on the processor to execute an operation through a communication bus, and when the instructions are executed by the processor, the processor is configured to:
   determine an intra prediction mode for a current block;
   when the current block is of a non-Matrix-based Intra Prediction (MIP) mode, a neighboring block of the current block is of MIP mode, the MIP mode of the neighboring block is mapped to a PLANAR mode, and the PLANAR mode is used to derive a Most Probable Modes List (MPM) of the current block of the non-MIP mode, wherein the derivation includes listing the PLANAR mode as a first mode in the MPM.

15. The encoder according to claim 14, wherein the neighboring block comprises at least one of a left neighboring block or an above neighboring block.

16. The encoder according to claim 14, wherein when the current block is of the non-MIP mode, the non-MIP mode is determined as an intra prediction mode for a color component of the current block.

17. The encoder according to claim 16, wherein the non-MIP mode is mapped to a MIP mode, wherein the MIP mode is one of MIP modes preset before encoding the current block.

18. The encoder according to claim 14, wherein the processor is configured to: write prediction mode information into a bitstream, wherein the prediction mode information indicates the intra prediction mode for the current block.

19. A non-transitory computer readable storage medium in which executable instructions are stored, when the executable instructions are executed by one or more processors, the one or more processors executing the mapping method according to claim 1.

20. A non-transitory computer readable storage medium in which executable instructions are stored, when the executable instructions are executed by one or more processors, the one or more processors executing the mapping method according to claim 9.

* * * * *